US009495844B2

(12) United States Patent
Toyoda et al.

(10) Patent No.: US 9,495,844 B2
(45) Date of Patent: Nov. 15, 2016

(54) MONEY HANDLING MACHINE, MONEY HANDLING SYSTEM AND MONEY HANDLING METHOD

(71) Applicant: GLORY LTD., Himeji-shi, Hyogo-ken (JP)

(72) Inventors: Yasutaka Toyoda, Himeji (JP); Masaki Inoue, Himeji (JP)

(73) Assignee: GLORY LTD., Himeji-shi, Hyogo-ken (JP)

( * ) Notice: Subject to any disclaimer, the term of this patent is extended or adjusted under 35 U.S.C. 154(b) by 0 days.

(21) Appl. No.: 14/419,675

(22) PCT Filed: Jul. 8, 2013

(86) PCT No.: PCT/JP2013/068627
§ 371 (c)(1),
(2) Date: Feb. 5, 2015

(87) PCT Pub. No.: WO2014/024613
PCT Pub. Date: Feb. 13, 2014

(65) Prior Publication Data

US 2015/0206402 A1 Jul. 23, 2015

(30) Foreign Application Priority Data

Aug. 6, 2012 (JP) ................................ 2012-173804
Aug. 8, 2012 (JP) ................................ 2012-176434

(51) Int. Cl.
*G06Q 40/00* (2012.01)
*G07D 11/00* (2006.01)
(Continued)

(52) U.S. Cl.
CPC ............... *G07G 5/00* (2013.01); *G07D 11/009* (2013.01); *G07D 11/0075* (2013.01); *G07F 19/201* (2013.01)

(58) Field of Classification Search
CPC ...... G07F 19/00; G07F 19/20; G07F 19/203; G07F 7/00; G06Q 20/108; G06Q 20/10; G06Q 20/02; G06Q 20/385; G06Q 20/382; G06Q 20/3829; G06Q 20/40; G06Q 20/4037; G06Q 40/02; G06Q 20/401; G06K 2017/0045; G06K 9/46; G06F 21/31; G06F 9/44589
See application file for complete search history.

(56) References Cited

U.S. PATENT DOCUMENTS 6,772,342 B1 8/2004 Hawthorne
7,137,551 B1 * 11/2006 Crews ................. G06Q 20/042
235/379

(Continued)

FOREIGN PATENT DOCUMENTS

CN 1519801 A 8/2004
CN 101923743 A 12/2010

(Continued)

OTHER PUBLICATIONS

Chinese Office Action with English translation (Chinese Patent Application No. 201380041925.4) (10 pages dated Apr. 15, 2016).

(Continued)

*Primary Examiner* — Thien T Mai
(74) *Attorney, Agent, or Firm* — Renner, Kenner, Greive, Bobak, Taylor & Weber

(57) ABSTRACT

The money handling machine (banknote depositing and dispensing machine 1) includes a unique-code generating unit 80 configured to generate a unique code that is used for a receiver of a journal in judging whether the journal is authentic or counterfeit based on at least a part or all of the deposit information printed on the journal by a printing unit (printer 6). The printing unit is configured to print on the journal the unique code generated by the unique-code generating unit 80 as well as the deposit information that is information regarding money deposited into the money handling machine.

4 Claims, 14 Drawing Sheets

(51) Int. Cl.

| | |
|---|---|
| ***G07F 19/00*** | (2006.01) |
| ***G07G 5/00*** | (2006.01) |

(56) References Cited

U.S. PATENT DOCUMENTS

| | | | |
|---|---|---|---|
| 7,580,892 | B1 | 8/2009 | Blosser et al. |
| 2004/0182678 | A1 | 9/2004 | Ina et al. |
| 2010/0245043 | A1 | 9/2010 | Doi et al. |

FOREIGN PATENT DOCUMENTS

| | | | |
|---|---|---|---|
| EP | 1 084 483 | B1 | 8/2010 |
| EP | 2 234 074 | A1 | 9/2010 |
| JP | 2010-72741 | A | 4/2010 |
| JP | 2010-231784 | A | 10/2010 |
| JP | 2012-53562 | A | 3/2012 |
| RU | 2 189 638 | C2 | 9/2002 |
| RU | 2 304 308 | C2 | 8/2007 |
| WO | WO 2011/161661 | A2 | 12/2011 |

OTHER PUBLICATIONS

European Search Report (Application No. 13827205.9—PCT/JP2013/068627) (7 pages—dated Feb. 19, 2016).

"Validating App Store Receipts" (11 pages—Apple Developer Last Updated: Nov. 1, 2010).

Russian Office Action with English translation (Application No. 2015107829/08(012607)) (13 pages dated Mar. 16, 2016).

European Search Report (Application No. 13827205.9—PCT/JP2013068627) (14 pages—dated Aug. 6, 2016).

* cited by examiner

[DEPOSIT NO. 4]

22/05/2012 18:24:41
0000-NO.0000000-00
ID NO.11-1111

TOTAL
CURRENCY USD

| DENOMI. | PCS. | AMOUNT |
|---|---|---|
| 20 | 3 | 60 |
| 10 | 10 | 100 |
| 1 | 7 | 7 |
| TOTAL | 20 | 167 |

89

FIG. 7

[MANUAL]

SERIAL NO.001
22/05/2012 18:27:39
0000-NO.0000000-00
ID NO.22-2222

TOTAL
CURRENCY USD
UNFIT NOTE
AMOUNT 123,456.000

78

FIG. 8

MONEY HANDLING MACHINE, MONEY HANDLING SYSTEM AND MONEY HANDLING METHOD

CROSS REFERENCE TO RELATED APPLICATIONS

This application is based upon and claims the benefit of priority from the prior Japanese Patent Applications No. 2012-173804 filed on Aug. 6, 2012 and No. 2012-176434 filed on Aug. 8, 2012. The entire contents of the above applications are incorporated herein by reference.

TECHNICAL FIELD

The present invention relates to a money handling machine for handling at least a money deposit process, a money handling system including the money handling machine, and a money handling method by means of the money handling machine.

BACKGROUND ART

Conventionally, in a finance institution such as a bank, a money deposit machine, which handles a depositing process of banknotes, coins and so on, is installed at a lobby. As this type of money deposit machine, a money deposit machine is known from JP 2011-100275, for example. In a finance institution where the money deposit machine is installed at the lobby, an operator (customer) who wants to deposit money executes a money deposit process at the money deposit machine. After the money deposit process has been executed at the money deposit machine, deposit information that is information regarding the deposited money is printed on a journal (receipt), and subsequently the journal is outputted from the money deposit machine. On the journal, a deposit date (date of the deposit process), a deposit time (date of the deposit process), an amount of deposited money, a deposit ID information or the like is printed. The deposit ID information is, for example, a customer number associated with the operator who deposited the money, a transaction number, or the like. Subsequently, the operator who deposited the money receives the journal from the money deposit machine, and delivers the journal to a teller at a teller window of the finance institution by hand. The teller receives the journal, confirms the deposit information printed on the journal, and pays the same amount of money as the deposited money at the money deposit machine into a bank account of the operator by bank remittance.

However, in a case wherein the money deposit machine is installed at the lobby, when the journal is counterfeited, the teller at the teller window in a bank or the like may not notice the counterfeited journal and may pay to a bank account by bank remittance. In order to prevent such an inappropriate payment by bank remittance caused by the counterfeited journal, conventionally, an upper-level terminal is communicatively connected to the money deposit machine installed at the lobby so that the information regarding the money depositing process at the money deposit machine is transmitted from the money deposit machine to the upper-level terminal. Then, the teller at the teller window in a bank or the like can confirm the deposit information at the money deposit machine through the upper-level terminal so as to prevent the inappropriate payment by bank remittance caused by the counterfeited journal. However, such conventional measures need the communicative connection between the money deposit machine and the upper-level terminal; thereby it is impossible to use the money deposit machine offline.

In addition, conventionally, in the money deposit machine installed at the lobby, when the money put into the money deposit machine is normal, the money is stored in the money deposit machine. However, when the money put into the money deposit machine is not normal but reject money (counterfeited money, greatly damaged money, abnormally transported money, or the like), the reject money is paid back out the money deposit machine. When the reject money is paid back from the money deposit machine and the operator, who wanted to deposit the money, delivers the journal and the reject money to the teller at the teller window of the finance institution by hand, the teller verifies the reject money. If the teller does not find abnormality, the teller pays to a bank account of the operator by bank remittance the sum of the amount of money printed on the journal and the amount of the reject money. If counterfeited money is put into the money deposit machine, the counterfeited money is paid back as reject money from the money deposit machine. Subsequently, if the reject money is delivered to the teller at the teller window and the teller does not find visually that the reject money is counterfeited money, the amount of the counterfeited money is paid by bank remittance, which causes damage of the bank. Herein, in the finance institution such as the bank, it is often the case that the money deposit machine and the teller window are away from each other. Thus, even if a warning device to issue a warning tone or to display a warning message when counterfeited money is put into the money deposit machine is disposed near the money deposit machine, the teller at the teller window may not notice the warning tone or the warning message so that the teller receives the counterfeited money.

SUMMARY OF THE INVENTION

The present invention has been made in view of the above circumstances. The object of the present invention is to provide a money handling machine, a money handling system and a money handling method, in which a unique code that is used for a receiver of a journal in judging whether the journal is authentic or counterfeit is printed on the journal, so that the receiver of the journal can judge whether the journal is authentic or counterfeit based on the unique code, and thus it is possible to prevent that the receiver of the journal inappropriately pays to a bank account of the operator by bank remittance even when the journal is counterfeited, and the money handling machine can be operated offline to reduce costs.

In addition, another object of the present invention is to provide a money handling machine and a money handling method, in which information regarding money judged as reject money is printed on a journal, so that if counterfeited money is put into the money handling machine, a receiver of the journal (for example, a teller at a teller window of a finance institution) can find that the reject money is the counterfeited money.

The first manner of the present invention is a money handling machine for handling at least a money deposit process including: a printing unit configured to print deposit information on a journal, the deposit information being information regarding money deposited into the money handling machine; and a unique-code generating unit configured to generate a unique code that is used for a receiver of a journal in judging whether the journal is authentic or counterfeit based on at least a part or all of the deposit information printed on the journal by the printing unit;

wherein the printing unit is configured to print on the journal the unique code generated by the unique-code generating unit as well.

According to such a money handling machine, the unique-code generating unit is configured to generate a unique code that is used for a receiver of a journal in judging whether the journal is authentic or counterfeit based on the deposit information printed on the journal by the printing unit. The printing unit is configured to print on the journal the unique code generated by the unique-code generating unit as well as the deposit information. Thus, since the unique code is printed on the journal, the receiver of the journal can judge whether the journal is authentic or counterfeit, based on the unique code. Thus, it is possible to prevent that the receiver of the journal inappropriately pays to a bank account of the operator by bank remittance even when the journal is counterfeited. Furthermore, the money handling machine can be operated offline, which can reduce costs.

In the money handling machine according to the first manner of the present invention, the unique-code generating unit may be configured to generate the unique code, based on information not printed on the journal, in addition to the part or all of the deposit information printed on the journal by the printing unit.

In the money handling machine according to the first manner of the present invention, the deposit information printed on the journal by the printing unit may include at least a date of the money deposit process or a time thereof.

In the money handling machine according to the first manner of the present invention, the unique code generated by the unique-code generating unit may be a number, an alphabet, a barcode, or a combination of a part or all of the number, the alphabet and the barcode.

The second manner of the present invention is a money handling system including the money handling machine as described above and a reception processing apparatus configured to receive a journal printed by the money handling machine, wherein the reception processing apparatus has: an additional unique-code generating unit configured to generate a unique code in accordance with the same method as that of the unique-code generating unit in the money handling machine; and an outputting unit configured to output the unique code generated by the additional unique-code generating unit.

The third manner of the present invention is a money handling method by means of a money handling machine for handling at least a money deposit process, the money handling method including: printing deposit information on a journal, the deposit information being information regarding money deposited into the money handling machine; and generating a unique code that is used for a receiver of a journal in judging whether the journal is authentic or counterfeit based on at least a part or all of the deposit information printed on the journal; wherein in printing the deposit information on the journal, the unique code generated by the unique-code generating unit as well is printed on the journal.

According to such a money handling method, a unique code is generated, which is used for a receiver of a journal in judging whether the journal is authentic or counterfeit based on the deposit information printed on the journal, and the unique code is printed on the journal in addition to the deposit information in printing the deposit information on the journal. Thus, since the unique code is printed on the journal, the receiver of the journal can judge whether the journal is authentic or counterfeit, based on the unique code. Thus, it is possible to prevent that the receiver of the journal inappropriately pays to a bank account of the operator by bank remittance even when the journal is counterfeited. Furthermore, the money handling machine can be operated offline, which can reduce costs.

In the money handling method according to the third manner of the present invention, in generating the unique code, the unique code may be generated based on information not printed on the journal, in addition to the part or all of the deposit information printed on the journal.

In the money handling method according to the third manner of the present invention, the deposit information printed on the journal may include at least a date of the money deposit process or a time thereof.

In the money handling method according to the third manner of the present invention, the generated unique code may be a number, an alphabet, a barcode, or a combination of a part or all of the number, the alphabet and the barcode.

The fourth manner of the present invention is a money handling machine for handling at least a money deposit process including: a recognition unit configured to recognize money put into the money handling machine; a judging unit configured to judge whether the money recognized by the recognition unit is normal money or reject money, the reject money being judged to be not normal, based on the recognition result by the recognition unit; and a printing unit configured to print on a journal information regarding money judged as reject money by the judging unit.

According to such a money handling machine, the judging unit is configured to judge whether the money recognized by the recognition unit is normal money or reject money, the reject money being judged to be not normal, based on the recognition result by the recognition unit, and the printing unit is configured to print on the journal the information regarding money judged as reject money by the judging unit. Thus, since the information regarding money judged as reject money is printed on the journal, even if counterfeited money is put into the money handling machine, a receiver of the journal (for example, a teller at a teller window of a finance institution) can find that the reject money is the counterfeited money, without the need to install a display device or a patrol light to display information of the counterfeited money.

In the money handling machine according to the fourth manner of the present invention, the printing unit may be configured to print on the journal information regarding a reject factor of the reject money, as the information regarding the reject money.

In the money handling machine according to the fourth manner of the present invention, the printing unit may be configured to print on the journal information regarding the number of the reject money, as the information regarding the reject money.

In the money handling machine according to the fourth manner of the present invention, the printing unit may be configured to print on the journal the information regarding the reject money in such a manner that the information is not able to be recognized by an operator who has executed the money deposit process by the money handling machine.

In this case, the printing unit may be configured to print on the journal the information regarding the reject money in such a manner that the information is able to be recognized by a receiver who receives the journal.

In the money handling machine according to the fourth manner of the present invention, the printing unit may be configured to print deposit information on the journal for each denomination, the deposit information being information regarding money deposited into the money handling machine, and the printing unit may be configured to print the information regarding the reject money for each denomination of the reject money, correspondingly to the deposit information for each denomination.

The fifth manner of the present invention is a money handling method by a money handling machine for handling at least a money deposit process, the money handling method including: recognizing money put into the money handling machine; judging whether the recognized money is normal money or reject money, the reject money being judged to be not normal, based on the recognition result; and printing on a journal information regarding money judged as reject money.

According to such a money handling method, since the information regarding money judged as reject money is printed on the journal, even if counterfeited money is put into the money handling machine, a receiver of the journal (for example, a teller at a teller window of a finance institution) can find that the reject money is the counterfeited money, without the need to install a display device or a patrol light to display information of the counterfeited money.

In the money handling method according to the fifth manner of the present invention, in printing on the journal the information regarding the reject money, information regarding a reject factor of the reject money may be printed on the journal.

In the money handling method according to the fifth manner of the present invention, in printing on the journal the information regarding the reject money, information regarding the number of the reject money may be printed on the journal.

In the money handling method according to the fifth manner of the present invention, in printing on the journal the information regarding the reject money, the information regarding the reject money may be printed on the journal in such a manner that the information is not able to be recognized by an operator who has executed the money deposit process by the money handling machine.

In this case, in printing on the journal the information regarding the reject money, the information regarding the reject money may be printed on the journal in such a manner that the information is able to be recognized by a receiver who receives the journal.

In the money handling method according to the fifth manner of the present invention, the money handling method may further include: printing deposit information on the journal for each denomination, the deposit information being information regarding money deposited into the money handling machine, wherein in printing on the journal the information regarding the reject money, the information regarding the reject money may be printed for each denomination of the reject money, correspondingly to the deposit information for each denomination.

According to the money handling machine according to the first manner of the present invention, or the money handling system according to the second manner of the present invention, or the money handling method according to the third manner of the present invention, it is possible to prevent that the receiver of the journal inappropriately pays to a bank account of the operator by bank remittance even when the journal is counterfeited, and the money handling machine can be operated offline to reduce costs.

According to the money handling machine according to the fourth manner of the present invention or the money handling method according to the fifth manner of the present invention, if counterfeited money is put into the money handling machine, a receiver of the journal (for example, a teller at a teller window of a finance institution) can find that the reject money is the counterfeited money.

BRIEF DESCRIPTION OF THE DRAWINGS

FIG. 4 is a structural view showing a concrete structure of a display and input unit of the banknote deposit machine shown in FIG. 2 and so on;

FIG. 5A is a functional block view of the banknote deposit machine shown in FIG. 2 and so on;

FIG. 6 is a flowchart showing a banknote deposit process in the banknote deposit machine shown in FIG. 2 and so on;

FIG. 7 is a view showing contents of a journal printed by a printer of the banknote deposit machine shown in FIG. 2 and so on;

FIG. 8 is a view showing contents of another journal printed by the printer of the banknote deposit machine shown in FIG. 2 and so on;

MODE FOR CARRYING OUT THE INVENTION

First Embodiment

The first embodiment of the present invention will be explained herebelow with reference to the drawings. FIGS.

1 to 8 are views showing a banknote deposit machine (money handling machine) in this embodiment, and a general structure of an office of a finance institution such as a bank at which the banknote deposit machine is installed.

Figure 1:
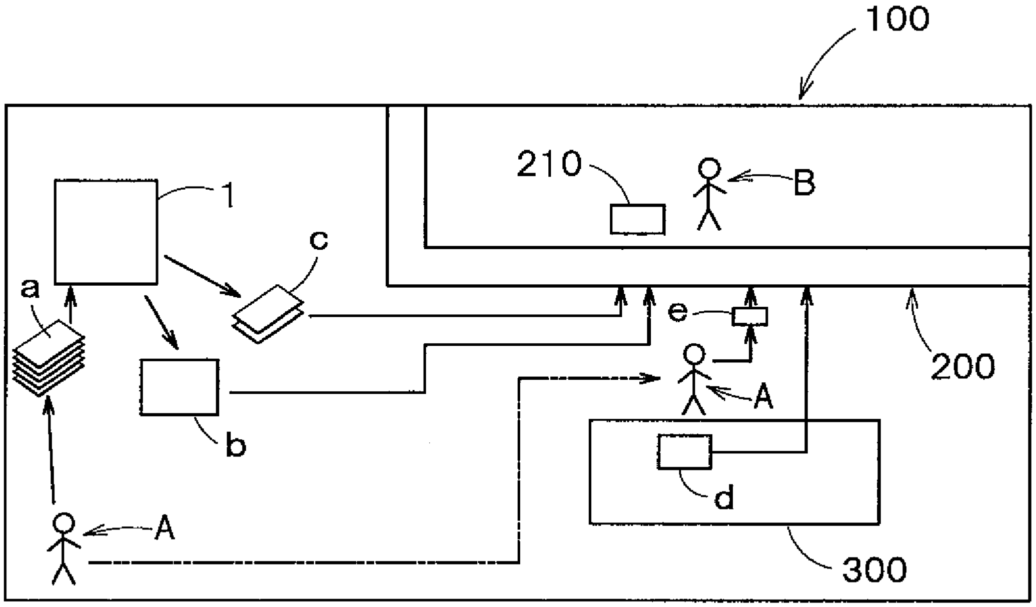
FIG. 1 is a schematic view showing a general structure of an office of a finance institution such as a bank, at which a banknote deposit machine according to the first embodiment of the present invention is installed.

At first, the general structure of the office of the finance institution such as a bank, at which the banknote deposit machine of this embodiment is installed, is explained with reference to FIG. 1. As shown in FIG. 1, one or a plurality of banknote deposit machines are installed at the lobby of the office 100 of the finance institution such as a bank (only one banknote deposit machine 1 is shown in the lobby of the office 100 in FIG. 1). Then, an operator who wants to deposit money (indicated by a reference sign A in FIG. 1) executes a deposit process of banknotes (indicated by a reference sign a in FIG. 1) at the banknote deposit machine 1. After the banknote deposit process has been executed at the banknote deposit machine 1, deposit information that is information regarding the deposited banknotes is printed on a journal (receipt) at the banknote deposit machine 1, and subsequently the journal is outputted from the banknote deposit machine 1. The journal outputted from the banknote deposit machine 1 is indicated by a reference sign b in FIG. 1. On the journal, a deposit date (date of the deposit process), a deposit time (date of the deposit process), a number of deposited banknotes for each denomination, a total amount of deposited banknotes, a deposit ID information or the like is printed. The deposit ID information is, for example, a customer number associated with the operator who deposited the money, a transaction number, or the like.

In addition, in the banknote deposit machine 1, when a banknote put into the banknote deposit machine 1 is normal, the banknote is stored in the banknote deposit machine 1. However, when the banknote put into the banknote deposit machine 1 is not normal, but a reject banknote (a counterfeited banknote, a greatly damaged banknote, an abnormally transported banknote, or the like), the reject banknote is paid back out the banknote deposit machine 1. The reject banknote paid back from the banknote deposit machine 1 is indicated by a reference sign c in FIG. 1. The operator who has executed the banknote deposit process at the banknote deposit machine 1 receives the journal outputted from the banknote deposit machine 1 and the reject banknote(s) paid back from the banknote deposit machine 1, moves to a table 300 installed at the lobby of the office 100 of the finance institution, and writes in a transmittal form (indicated by a reference sign d in FIG. 1) at the table 300. The number of coins and/or banknotes for each denomination and the total amount of money, to be paid by bank remittance, are written in the transmittal form.

Then, the operator moves to a teller window 200 installed at the lobby of the office 100 of the finance institution, and delivers the journal received from the banknote deposit machine 1 by hand, the reject banknote(s) paid back from the banknote deposit machine 1, the transmittal form written at the table 300, a bank deposit book (indicated by a reference sign e in FIG. 1) and the like, to a teller indicated by a reference sign B in FIG. 1. If the operator wants to deposit coins and/or the reject banknote(s) rejected by the banknote deposit machine 1, the operator delivers them directly to the teller by hand. The teller counts the coins and the reject banknote(s). Subsequently, the teller confirms the deposit information printed on the journal received from the operator (customer), and pays the total amount of money of the deposited banknote(s) at the banknote deposit machine 1 and the coin(s) and the reject banknote(s) directly passed from the operator, into a bank account of the operator by bank remittance. In addition, as shown in FIG. 1, a reception processing apparatus 210 is provided for each teller on the side of the teller at the teller window 200. The reception processing apparatus 210 is configured to receive the journal delivered to the teller from the operator. The detailed structure of the reception processing apparatus 210 is described later. Furthermore, a lamp for judging authenticity of the banknote (specifically, for example, a violet lamp) is provided on the side of the teller at the teller window 200. When the banknote is irradiated by the lamp for judging authenticity, if the banknote is authentic, a fluorescent ink printed on the banknote shines. Thus, the teller can judge whether the reject banknote received from the operator is authentic or counterfeited, by irradiating the banknote with the lamp for judging authenticity.

Figure 2:
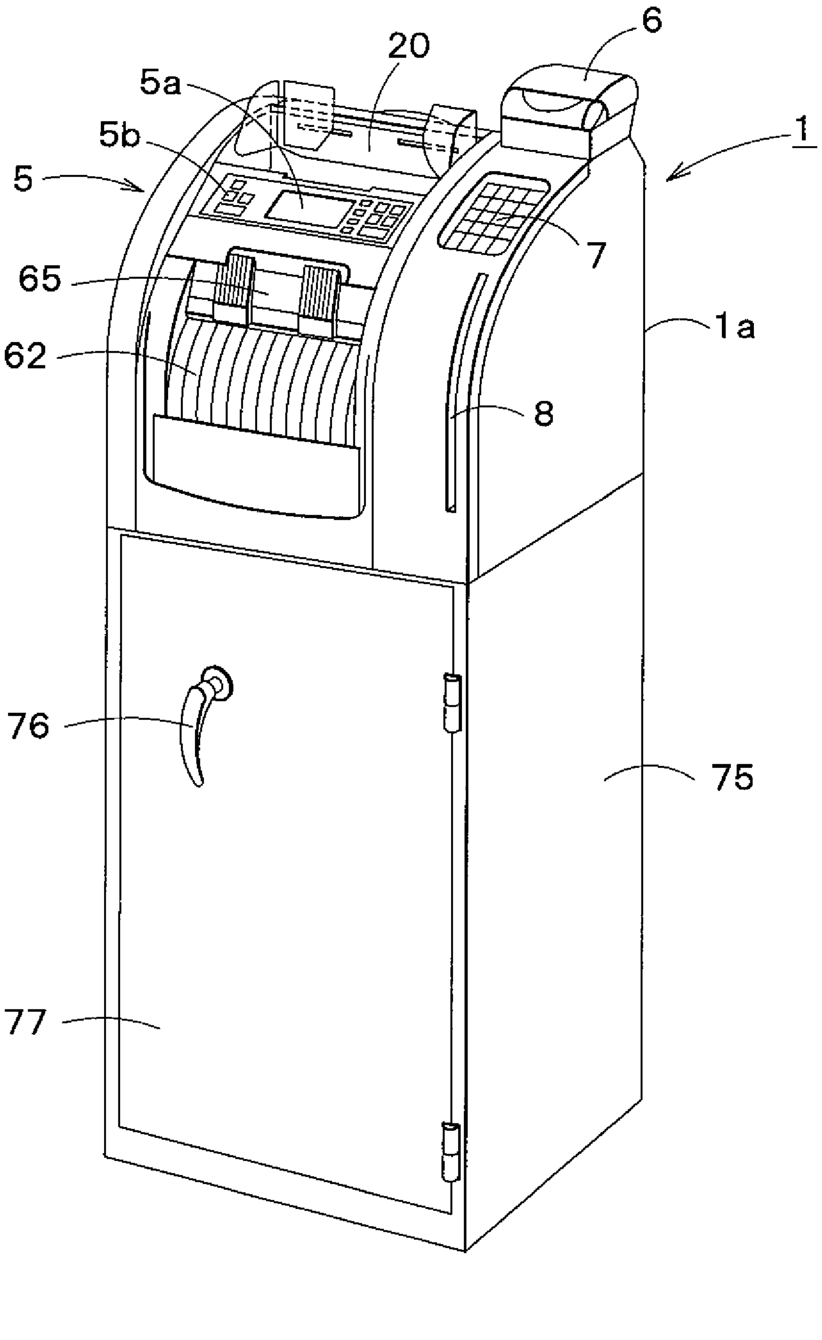
FIG. 2 is a perspective view showing a structure of the banknote deposit machine according to the first embodiment of the present invention.
Figure 3:
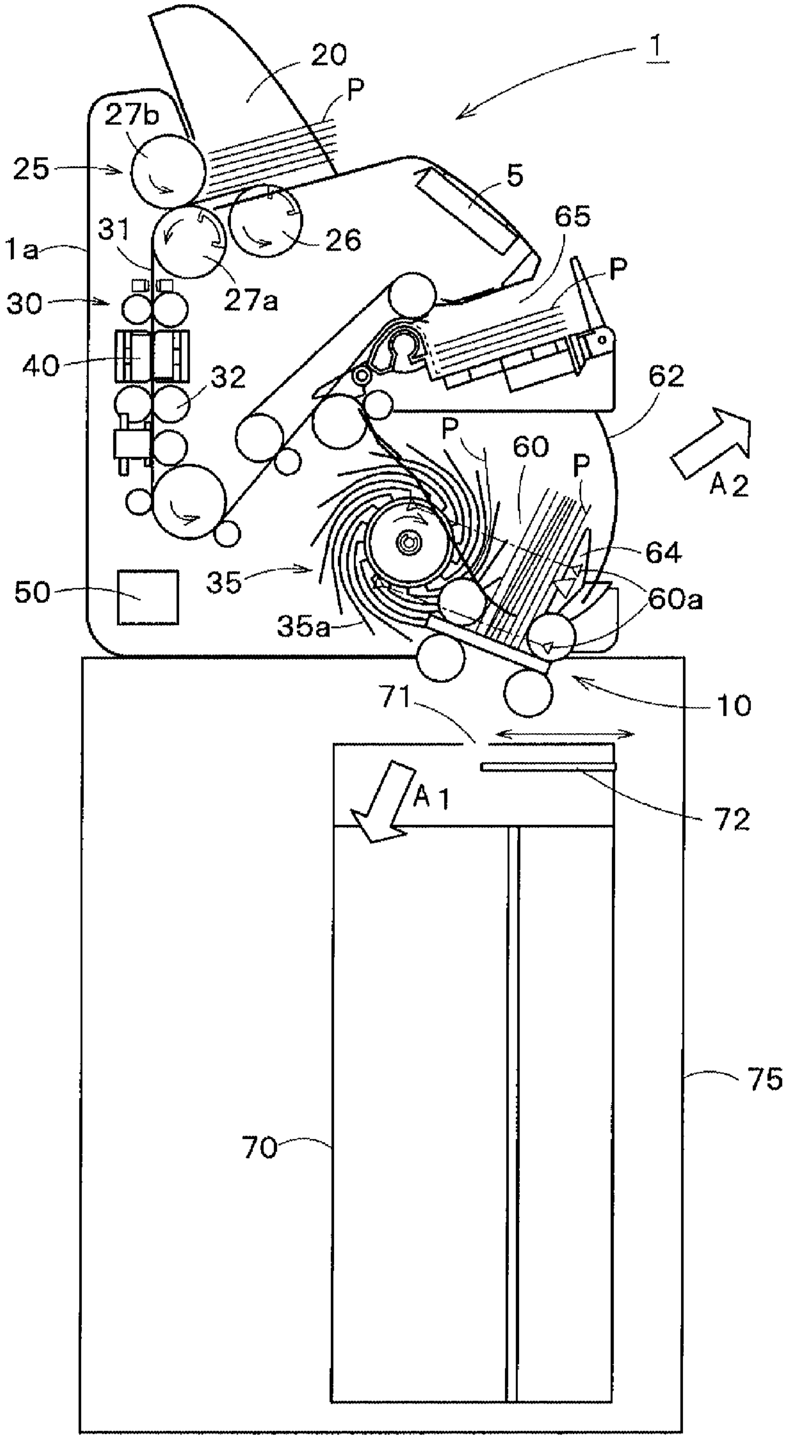
FIG. 3 is a side sectional view of the banknote deposit machine shown in FIG. 2.

Next, a detailed structure of the banknote deposit machine 1 installed at the lobby of the office 100 of the finance institution is explained with reference to FIGS. 2 to 5A. FIG. 2 is a perspective view showing a structure of the banknote deposit machine 1 of this embodiment, and FIG. 3 is a side sectional view of the banknote deposit machine 1 shown in FIG. 2. As shown in FIGS. 2 and 3, the banknote deposit machine 1 includes: a housing 1*a*, a placement unit 20 disposed on the housing 1*a*, on which a plurality of banknotes P are placed; a reception unit 25 configured to take the plurality of banknotes P placed on the placement unit 20, one by one, into the housing 1*a*; a transport unit 30 configured to transport the banknotes P having been taken in by the reception unit 25; a stacking unit 60 configured to stack the banknotes P having been transported by the transport unit 30; a recognition unit 40 disposed on the transport unit 30, the recognition unit 40 configured to recognize the banknotes P transported by the transport unit 30 and to count the banknotes P; and a storing cassette 70 configured to receive the banknotes P having been staked in the stacking unit 60 so as to be stored therein.

As shown in FIG. 3, the reception unit 25 includes: a kicker roller 26 configured to give a driving force to a banknote P located undermost of the plurality of banknotes P placed on the placement unit 20; and a feed roller 27*a* located on a downstream side of the kicker roller 26 in a feeding direction of the banknote P, the feed roller 27*a* configured to feed the banknote P having been kicked out by the kicker roller 26 into an inside of the housing 1*a*. A gate roller (reverse roller) 27*b* is disposed oppositely to the feed roller 27*a*. A gate unit is formed between the feed roller 27*a* and the gate roller 27*b*.

In addition, as shown in FIG. 3, the transport unit 30 is composed of a transport belt 31 configured to transport the banknotes P, a transport roller 32 and so on. At a most downstream position of the transport unit 30 and near to the stacking unit 60, there is disposed a stacking wheel 35 configured to receive the banknotes P having been transported by the transport unit 30, one by one, between vanes 35*a* so as to align and stack the banknotes P in the stacking unit 60.

In addition, as shown in FIG. 3, the stacking unit 60 has such a shape that the stacked banknotes P are inclined toward a front surface side. In the stacking unit 60, the banknotes P having been sent from the transport unit 30 are supported by a support unit 64, such that the banknotes P are stacked so as to be inclined toward the front surface side in a standing condition. A banknote presence detecting sensor 60*a* configured to detect whether a banknote is present or not is arranged at the stacking unit 60. In this patent application, the front surface side means a side on which an operator places a banknote P on the placement unit 20 and takes a banknote P from the stacking unit 60. In FIG. 3, the front surface side is the right side. On the other hand, in this patent application, a rear surface side means a side opposed to the front surface side, which is the left side in FIG. 3.

In addition, as shown in FIGS. 2 and 3, disposed on the front surface side of the stacking unit 60 is a front shutter unit 62 for opening and closing a front opening from which stacked banknotes P are taken out from outside. The front shutter unit 62 is controlled by a below-described control unit 50, such that the front shutter unit 62 cannot be opened at least while a banknote P is transported to the storing cassette 70 by a clamping transport mechanism 10 (explained below).

In addition, as shown in FIG. 3, the stacking unit 60 is provided with a clamping transport mechanism 10 configured to clamp surfaces of banknotes P stacked in the stacking unit 60 and to transport the banknotes P in a direction parallel with the surfaces, such that the banknotes P are stored into the storing cassette 70. To be more specific, the clamping transport mechanism 10 is configured to clamp a surface of a banknote P that is located forefront of the banknotes P stacked in the stacking unit 60 and a surface of a banknote P that is located rearmost thereof, and is configured to simultaneously transport the plurality of banknotes P to the storing cassette 70 (see arrow $A_1$ in FIG. 3).

In addition, as shown in FIG. 3, the storing cassette 70 is provided with a slit opening 71 for taking in the banknotes P having been transported by the clamping transport mechanism 10, and a slit shutter unit 72 for opening and closing the slit opening 71. The storing cassette 70 is stored in a storing housing 75 shown in FIG. 2 such that the storing cassette 70 can be drawn out therefrom. In addition, as shown in FIG. 2, by opening a door 77, the storing cassette 70 can be loaded into the banknote deposit machine 1 and removed therefrom. In more detail, the door 77 is provided with a handle 76 and an electromagnetic key (not shown). By controlling to unlock the electromagnetic key, the handle 76 can be rotated to open the door 77. The loading of the storing cassette 70 into the banknote deposit machine 1 and the removal of the storing cassette 70 from the banknote deposit machine 1 are carried out by a staff of an armoured car company.

Figure 4:
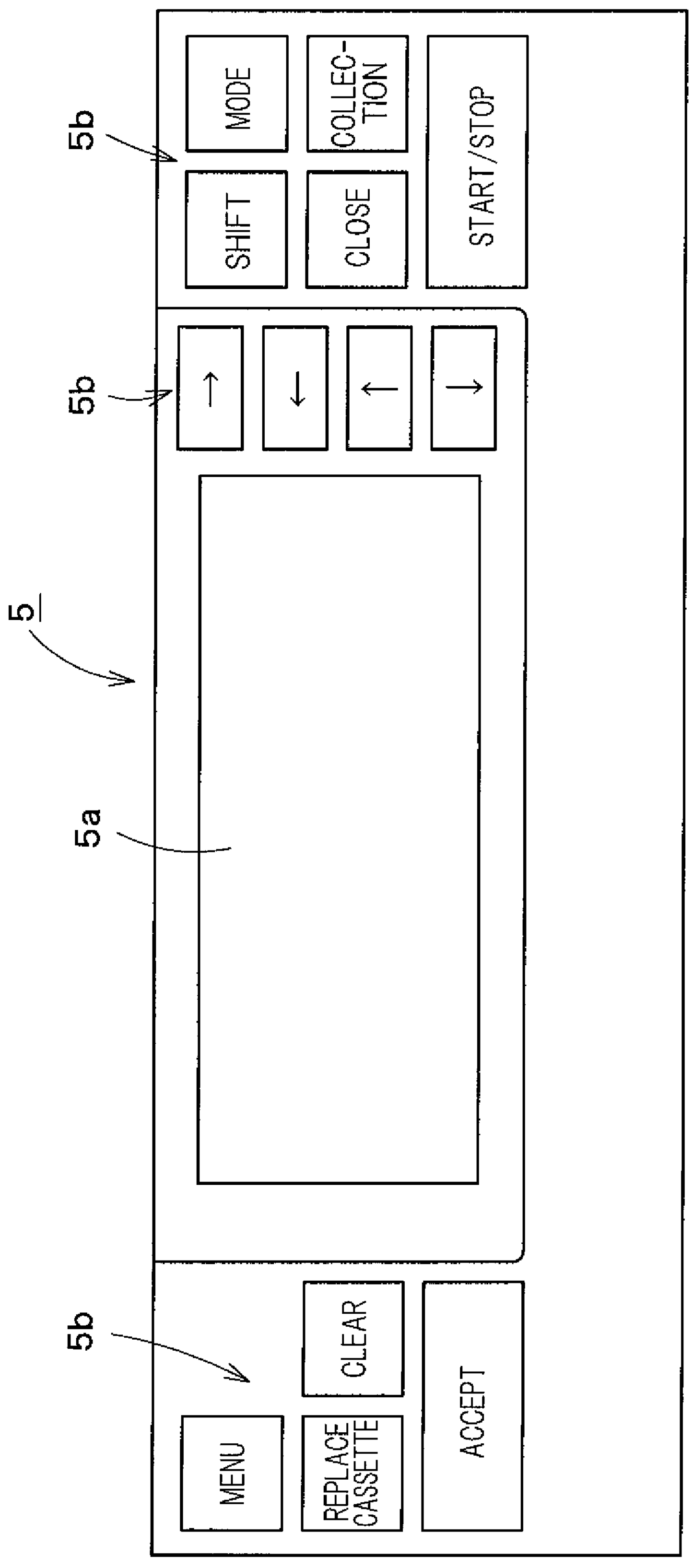

In addition, as shown in FIG. 2, the housing 1*a* of the banknote deposit machine 1 is provided with a display and input unit 5 having a function of displaying predetermined information and a function for enabling data input. A concrete structure of the display and input unit 5 is shown in FIG. 4. As shown in FIG. 4, the display and input unit 5 is composed of a monitor 5*a* which displays a count result of a banknote(s) P, deposit information and so on, and a plurality of input keys 5*b* through which an operator inputs various instructions. The monitor 5*a* is configured to display, for example, the number of banknotes P stored in the storing cassette 70 for each denomination, the total amount of money, and so on. As shown in FIG. 4, the plurality of input keys 5*b* are composed of a menu key, an exchange key, a clear key, a return key, an upward arrow key, a downward arrow key, a rightward arrow key, a leftward allow key, a shift key, a mode key, a close key, a collection key, a start/stop key and so on.

In addition, as shown in FIG. 2, the housing 1*a* of the banknote deposit machine 1 is provided with: a printer 6 configured to print the count result of the banknote(s) P, the deposit information, and so on; numeric keys 7 through which an operator inputs various numeric information to the below-described control unit 50; and a card reading unit 8 configured to read an ID card held by an operator for obtaining identification information of the operator.

In addition, as shown in FIG. 3, the transport unit 30 is provided with the reject unit 65 to which a banknote P is transported, when some error occurs so that the banknote P is not transported to the stacking unit 60.

The error herein means a recognition error and a transport error. The recognition error means that information recognized by the recognition unit 40 does not confirm to information stored in the control unit 50 in advance. For example, the recognition error includes an error in which a recognized banknote P is a banknote P whose kind is different from a preset kind, an error in which a kind of a banknote P could not be recognized (specifically, including a greatly damaged banknote and a counterfeited banknote), and so on.

The transport error means an error generated while a banknote(s) P is transported by the transport unit 30. For example, the transport error includes an error in which a banknote P is transported askew (skewed state), an error in which a plurality of banknotes P are transported without a predetermined interval therebetween (chain state), an error in which a plurality of banknotes P are transported in a overlapped manner (overlapped state) and so on.

Figure 5A:
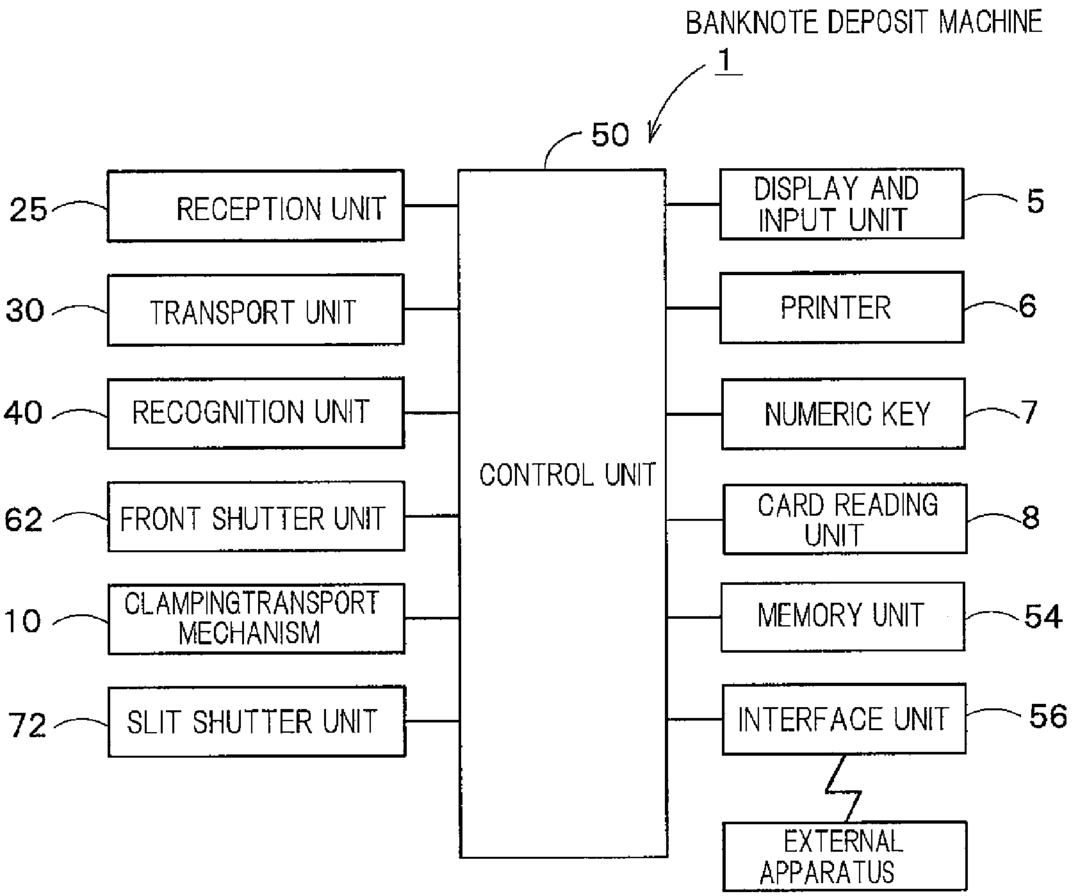

The banknote deposit machine 1 in this embodiment is provided with the control unit 50 as shown in FIG. 5A. The control unit 50 is configured to control the respective constituent elements of the banknote deposit machine 1. As shown in FIG. 5, connected to the control unit 50 are the reception unit 25, the transport unit 30, the recognition unit 40, the front shutter unit 62, the clamping transport mechanism 10, the slit shutter unit 72, the display and input unit 5, the printer 6, the numeric keys 7, the card reading unit 8 and so on. Recognition/count information of a banknote(s) P having been recognized/counted by the recognition unit 40 is transmitted to the control unit 50. In addition, the control unit 50 is configured to function as a judging unit for judging whether the banknote(s) P recognized and counted by the recognition unit 40 is a normal banknote or a reject banknote based on the recognition/count result of the banknote(s) P by the recognition unit 40.

In addition, various instructions from an operator inputted through the respective input keys 5*b* of the display and input unit 5 and the numeric keys 7 are transmitted to the control unit 50. In addition, ID information of an operator having been read by the card reading unit 8 and so on are also transmitted to the control unit 50. In addition, the control unit 50 is configured to send control signals to the respective constituent elements, such as the reception unit 25, the transport unit 30, the front shutter unit 62, the clamping transport mechanism 10, the slit shutter unit 72, the display and input unit 5, the printer 6 and so on, so as to control these constituent elements.

In addition, as shown in FIG. 5A, a memory unit 54 is connected to the control unit 50. The memory unit 54 is configured to store: preset information such as an apparatus ID for specifying the banknote deposit machine 1, a count result of a banknote(s) P, and so on.

In addition, as shown in FIG. 5A, an interface unit 56 is connected to the control unit 50. Through the interface unit 56, the control unit 50 can transmit a signal to an external apparatus and can receive a signal therefrom.

Next, an operation of the banknote deposit machine 1 as structured above (specifically, a total flow of the deposit process at the banknote deposit machine 1) is explained with reference to the flowchart shown in FIG. 6.

When the operator places a plurality of banknotes P on the placement unit 20 ("YES" in STEP 1), the plurality of banknotes P placed on the placement unit 20 are taken, one by one, into the machine by the reception unit 25 (STEP 2).

At this time, the undermost banknote P among the plurality of banknotes P placed on the placement unit 20 is kicked out by the kicker roller 26, and the kicked-out banknote P is fed out by the feed roller 27*a*. The banknotes P fed by the feed roller 27*a* are separated, one by one, by the action of the gate roller 27*b*.

Following thereto, the banknotes P having been taken in by the reception unit 25 are transported by the transport unit 30. At this time, the banknotes P transported by the transport unit 30 are recognized/counted by the recognition unit 40 disposed on the transport unit 30 (STEP 3). The control unit 50 judges whether the banknote(s) P recognized and counted by the recognition unit 40 is a normal banknote or a reject banknote based on the recognition/count result of the banknote(s) P by the recognition unit 40.

During the transport of the banknotes P by the transport unit 30, when the recognition error and/or the transport error occur ("YES" in STEP 4), the banknote(s) P is transported to the reject unit 65 (STEP 5). On the other hand, when the recognition error and/or the transport error do not occur ("NO" in STEP 4), the banknotes P being transported are transported to the stacking unit 60 (STEP 6).

When the banknotes P are transported to the stacking unit 60, the banknotes P are received between the vanes 35*a* of the stacking wheel 35 so as to be aligned and stacked in the stacking unit 60. Then, the banknotes P having been transported by the stacking wheel 35 are stacked in the stacking unit 60 such that the banknotes P are inclined toward the front surface side in a standing condition. The display and input unit 5 displays a number of the banknotes P stacked in the stacking unit 60 for each denomination and a total amount of the banknotes P stacked in the stacking unit 60. In addition, the recognition result (the number of the banknotes P stacked in the stacking unit 60 for each denomination, the total amount of the banknotes P, and so on) together with the ID of the operator is stored in the memory unit 54.

In the above manner, when all the plurality of banknotes P placed on the placement unit 20 have been transported to the stacking unit 60 so that no banknote P remains on the placement unit 20 ("YES" in STEP 7), an indication for requiring an acceptance instruction for the number of the banknotes P stacked in the stacking unit 60 for each denomination and the total amount of the banknotes P stacked in the stacking unit 60 is displayed on the display and input unit 5 (STEP 8).

Then, as shown in "YES" in STEP 9, when the acceptance instruction is inputted by the operator through the display and input unit 5 (specifically, when the operator presses down the return key of the display and input unit 5), the plurality of banknotes P stacked in the stacking unit 60 are stored into the storing cassette 70 through the slit opening 71 by the clamping transport mechanism 10 (STEP 10) (see arrow $A_1$ of FIG. 3). At this time, the slit shutter unit 72 is moved on the front surface side so that the slit-like slit opening 71 is opened. On the other hand, except when a banknote(s) P is stored in the storing cassette 70, the slit shutter unit 72 is moved on the rear surface side so that the slit opening 71 is closed. When the banknote(s) stacked in the stacking unit 60 is stored in the storing cassette 70, the following retaining-check process is executed. The retaining-check process means a process to confirm whether a banknote is left on the stacking wheel 35, when one or two banknotes jump up from the stacking unit 60 to ride on the stacking wheel 35 after the counting process of the banknotes(s). The banknote(s) that has ridden on the stacking wheel 35 were already counted, and thus should be collected into the storing cassette 70 when the acceptance instruction is inputted by the operator. However, even if the slit shutter unit 72 is opened and closed under this situation, those banknotes are not transmitted into the storing cassette 70, which causes a count error. According to the retaining-check process, it is confirmed whether a banknote is left on the stacking wheel 35 or not, which prevents the above trouble of the count error. The retaining-check process is explained specifically. At first, the slit shutter unit 72 is moved on the rear surface side so that the slit opening 71 is closed. Then, the stacking wheel 35 is rotated for a period of several seconds (STEP 11). According to this action of the stacking wheel 35, even when some banknotes have ridden on the stacking wheel 35, those banknotes are caused to fall onto the stacking unit 60. Thereafter, it is confirmed whether the banknote presence sensor 60*a* arranged at the stacking unit 60 detects a banknote (STEP 12). When the banknote presence sensor 60*a* detects a banknote ("YES" in STEP 12), the slit shutter unit 72 is moved on the front surface side so that the slit-like slit opening 71 is opened. Then, the banknote(s) P stacked in the stacking unit 60 are stored into the storing cassette 70 through the slit opening 71 by the clamping transport mechanism 10. On the other hand, when the banknote presence sensor 60*a* does not detect a banknote ("NO" in STEP 12), the retaining-check process is ended, and the deposit is accepted (STEP 13). According to the retaining-check process, even when one or two banknotes jump up from the stacking unit 60 to ride on the stacking wheel 35 after the counting process of the banknotes(s), it is possible to store the banknote(s) having ridden on the stacking wheel 35 into the storing cassette 70. After the retaining-check process is ended, deposit information (the deposit date, the deposit time, the number of the deposited banknotes P for each denomination, the total amount of the deposited banknotes P, the deposit ID information, or the like) is printed on a journal (receipt) by the printer 6 (STEP 14). The journal is outputted from the banknote deposit machine 1.

When there is a banknote(s) P in the reject unit 65, the operator places the banknote P again on the placement unit 20. Thus, the steps as described above are repeated so that all the banknotes P are transported to the stacking unit 60. However, a banknote P, which is transported to the reject unit 65 no matter how many times the operator tries, is judged as an unreceivable banknote P, and such a banknote P is excluded from the banknotes to be stored. The operator will give up depositing such a reject banknote, or bring it to the teller window to execute a deposit process for it. In addition, when the operator does not accept the number of the banknotes P stacked in the stacking unit 60 for each denomination and/or the total amount thereof ("NO" in STEP 9), by inputting a return instruction through the display and input unit 5, the front shutter unit 62 is opened, whereby the stacked banknotes P can be taken out (STEP 15) (see arrow $A_2$ of FIG. 3). When the banknotes P stacked in the stacking unit 60 have been collected by the operator ("YES" in STEP 16), the process is finished.

Figure 6:
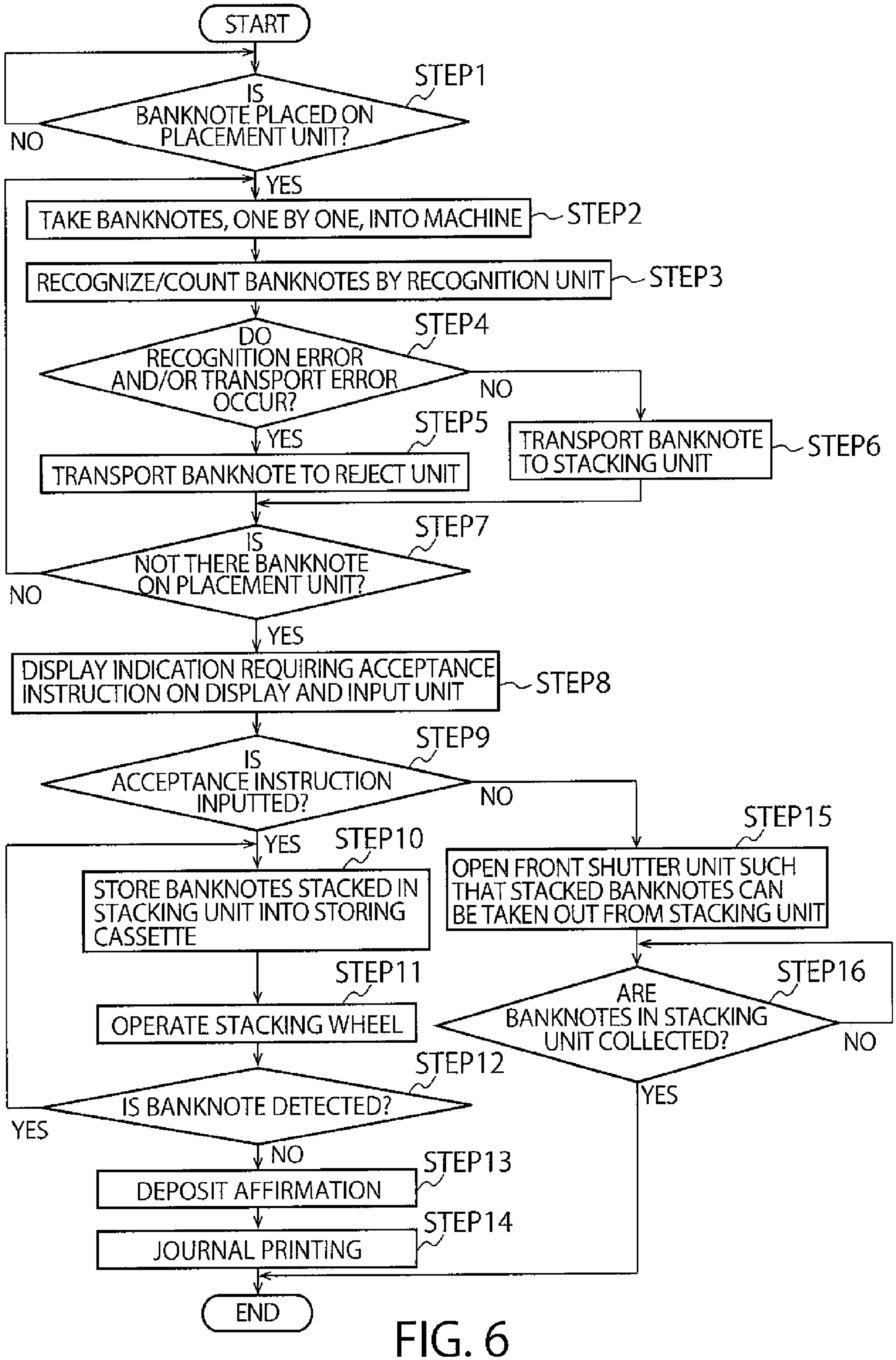

Next, the deposit information printed on the journal by the printer 6 when the deposit process of the banknotes P was executed as shown in FIG. 6, is explained in detail with reference to FIG. 7. FIG. 7 is a view showing contents of the journal printed by the printer 6 of the banknote deposit machine 1. In the contents of the journal shown in FIG. 7, "[DEPOSIT No. 4]" indicates the transaction number, "22/05/2012" indicates the deposit date, and "18:24:41" indicates the deposit time. In addition, "0000-No. 0000000-00" indicates the apparatus ID of the banknote deposit machine 1 (specifically, information indicating the office location and the apparatus number), and "ID No. 11-11111" indicates the ID information of the operator. Furthermore, in the "CURRENCY" area, "DENOMI" indicates the denominations of the banknotes P, "PCS" indicates the numbers of the deposited banknotes P, and "AMOUNT" indicates the total amount of the deposited banknotes P for each denomination. In the lower "TOTAL" area, the number of all the deposited banknotes and the total amount of the banknotes for all denominations are indicated.

In the banknote deposit machine 1 of this embodiment, as shown in FIG. 5A, a unique-code generating unit 80 is connected to the control unit 50. The unique-code generating unit 80 is configured to generate a unique code that is used (useful) for the teller (a receiver of a journal) in judging whether the journal is authentic or counterfeit based on at least a part or all of the deposit information printed on the journal by the printer 6. The printer 6 is configured to print on the journal the unique code generated by the unique-code generating unit 80 in addition to the deposit information. Specifically, the lowermost numeric sign "89" in FIG. 7 is the unique code.

The method of generating the unique code by means of the unique-code generating unit 80 is explained below. As described above, the unique-code generating unit 80 is configured to generate the unique code based on at least a part or all of the deposit information printed on the journal by the printer 6. Specifically, the unique code is the sum of each figure of the various indications in the journal. That is to say, "89" is the sum of each figure in the journal shown in FIG. 7: "4" in the "[DEPOSIT No. 4]"; "2", "2", "0", "5", "2", "0", "1", "2", "1", "8", "2", "4", "4" and "1" in the "22/05/2012 18:24:41"; "0" of each digit in the "0000-No. 0000000-00"; "1" of each digit in the "ID No. 11-11111"; "2", "0", "3", "6" and "0" in the "20 3 60" in the "CURRENCY" area; "1", "0", "1", "0", "1", "0" and "0" in the "10 10 100" in the "CURRENCY" area; "1", "7" and "7" in the "1 7 7" in the "CURRENCY" area; and "2", "0", "1", "6" and "7" in the "TOTAL 20 167" in the "CURRENCY" area. The number "89" is printed on the journal as the unique code by the printer 6. The operator who has executed the deposit process at the banknote deposit machine 1 (indicated by the reference sign A in FIG. 1) cannot understand the meaning of such a unique code, but the teller who receives the journal (indicated by the reference sign B in FIG. 1) can understand the meaning thereof.

Another example of unique code is explained below. In the banknote deposit machine 1 as shown in FIG. 2 and so on, an unfit note/an unfit coin that cannot be recognized by the recognition unit 40 of the banknote deposit machine 1 and a valuable medium other than cash, such as a gift ticket, a check and so on, can be stored into the storing cassette 70 of the banknote deposit machine 1. Specifically, the operator inputs information related to the valuable medium, specifically, an amount (of money) of the valuable medium and so on, to the control unit 50 through the display and input unit 5, and presses down the return key. Then, the information related to the valuable medium, which has been inputted by the operator to the control unit 50, is printed on the journal by the printer 6. The journal printed by the printer 6 is shown in FIG. 8. In addition, at this time, the front shutter unit 62 is opened by the control unit 50, whereby an envelope containing the valuable medium can be put into the stacking unit 60.

After that, when the operator sets on the stacking unit 60 the envelope containing the valuable medium and the journal on which the information of the valuable medium is printed, and presses down the return key, the front shutter unit 62 is closed. Then, the envelope containing the valuable medium and the journal, which have been set in the stacking unit 60, are stored into the storing cassette 70 through the slit opening 71 by the clamping transport mechanism 10 (see arrow $A_1$ of FIG. 3). After the envelope containing the valuable medium has been stored into the storing cassette 70, the valuable medium in the storing cassette 70 is not under the management authority of the store but under the management authority of the armoured car company. In this manner, the operation for storing the valuable medium into the storing cassette 70 is finished.

As shown in FIG. 8, even in a case wherein an unfit note/an unfit coin that cannot be recognized by the recognition unit 40 and a valuable medium other than cash, such as a gift ticket, a check and so on, are caused to be stored into the storing cassette 70 of the banknote deposit machine 1, the unique-code generating unit 80 generates a unique code based on at least a part or all of the deposit information to be printed on the journal by the printer 6, and the printer 6 prints on the journal the unique code generated by the unique-code generating unit 80 in addition to the deposit information. Specifically, in accordance with the same method of generating the unique code as that shown in FIG. 7, the unique code is the sum of each figure of the various indications in the journal. That is to say, the unique code is "78", which is the sum of each figure in the journal shown in FIG. 8: "0", "0" and "1" in the "[SERIAL No. 001]"; "2", "2", "0", "5", "2", "0", "1", "2", "1", "8", "2", "7", "3" and "9" in the "22/05/2012 18:27:39"; "0" of each digit in the "0000-No. 0000000-00"; "2" of each digit in the "ID No. 22-2222"; and "1", "2", "3", "4", "5", "6", "0", "0" and "0" in the "123, 456. 000" in the "AMOUNT" area. The number "78" is printed on the journal as the unique code by the printer 6.

The operator receives the journal from the banknote deposit machine 1, moves to the teller window 200, and delivers the journal to the teller at the teller window 200 by hand. The teller calculates the unique code from the deposit information on the received journal, and thereby verifies the unique code printed on the journal. Accordingly, the teller can confirm whether the printed unique code is appropriate or not. That is to say, if the journal is counterfeited, no unique code is printed on the journal, or incorrect unique code is printed on the journal. Thus, the teller can immediately find that the journal is counterfeited. Thus, it is possible to prevent that the teller inappropriately pays to a bank account of the operator by bank remittance even when the journal is counterfeited.

Figure 5B:
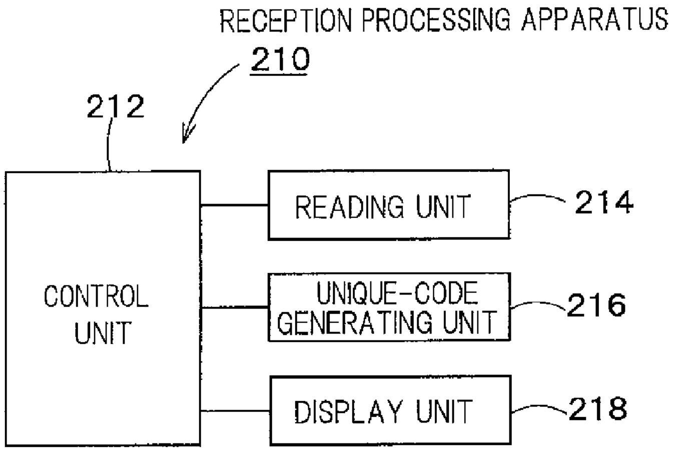
FIG. 5B is a functional block view of the reception processing apparatus shown in FIG. 1.

Next, the structure of the reception processing apparatus 210 (see FIG. 1) arranged on the side of the teller at the teller window 200 is explained with reference to FIG. 5B. FIG. 5B is a functional block view of the reception processing apparatus 210 shown in FIG. 1.

As shown in FIG. 5B, the reception processing apparatus 210 includes a control unit 212, a reading unit 214, a unique-code generating unit 216 and a display unit 218. Herein, the reading unit 214, the unique-code generating unit 216 and the display unit 218 are connected to the control unit 212. The reading unit 214 consists of a scanner or the like, and thus is able to read the deposit information printed on the journal received from the operator. The unique-code generating unit 216 is configured to generate a unique code in accordance with the same method of generating the unique code as that of the unique-code generating unit 80 of the banknote deposit machine 1, based on the information read by the reading unit 214. The display unit 218 consists of a monitor or the like, which displays the deposit information printed on the journal and read by the reading unit 214. Herein, the control unit 212 is configured to function as an output unit that outputs the unique code generated by the unique-code generating unit 216, and the outputted unique code is displayed on the display unit 218, for example. Since the reception processing apparatus 210 as described above is provided for each teller, the teller who has received the journal can cause the reading unit 214 to read the journal and cause the display unit 218 to display the unique code generated by the unique-code generating unit 216 without the need to manually calculate the unique code based on the deposit information printed on the received journal. Then, the teller can easily confirm whether the journal is authentic or not by comparing the unique code printed on the journal with the unique code displayed on the display unit 218.

As described above, according to the banknote deposit machine 1 of this embodiment and the money handling system including the banknote deposit machine 1, the unique-code generating unit 80 is configured to generate a unique code that is used for the teller (a receiver of the journal) in judging whether the journal is authentic or counterfeit based on the deposit information printed on the journal by the printer 6, and the printer 6 is configured to print on the journal the unique code generated by the unique-code generating unit 80 as well as the deposit information. Thus, since the unique code is printed on the journal, the teller can judge whether the journal is authentic or counterfeit, based on the unique code. Thus, it is possible to prevent that the teller inappropriately pays to a bank account of the operator by bank remittance even when the journal is counterfeited. Furthermore, the banknote deposit machine 1 can be operated offline, which can reduce costs.

In particular, if the deposit date and/or the deposit time is included as the deposit information printed on the journal, the value of the unique code may be changed depending on the deposit date and/or the deposit time. In this case, it is more difficult to specify the unique code when the journal is counterfeited, so that it is more surely prevented that the teller inappropriately pays to a bank account of the operator by bank remittance even when the journal is counterfeited.

Herein, in the above embodiment, the unique-code generating unit 80 generates the unique code based on all the deposit information printed by the printer 6. However, the present invention is not limited to this manner. The unique-code generating unit 80 may be configured to generate the unique code based on only a part of the deposit information printed by the printer 6. For example, the unique-code generating unit 80 may generate the unique code based on only the deposit date, the deposit time and the deposit ID information, not based on the numbers of the banknotes for each denomination and the total amounts of the banknotes in the deposit information. In addition, the unique-code generating unit 80 may generate the unique code based on information not printed on the journal, in addition to a part or all of the deposit information printed on the journal. For example, the code number of the office (specifically, three-digit or four-digit number) may be used as the information not printed on the journal. That is to say, the unique-code generating unit 80 may generate the unique code by adding each figure of the code number of the office to the number based on the deposit information printed on the journal by the printer 6.

The unique code generated by the unique-code generating unit 80 is not limited to a number as shown in FIG. 6 and FIG. 7. An alphabet or a barcode may be used as the unique code, instead of a number. In addition, a combination of a part or all of the number, the alphabet and the barcode may be used as the unique code to be generated by the unique-code generating unit 80.

In addition, in the above embodiment, the reception processing apparatus 210 is provided for each teller, and includes: the unique-code generating unit 216 configured to generate a unique code in accordance with the same method of generating the unique code as that of the unique-code generating unit 80 of the banknote deposit machine 1; and the control unit 212 configured to output the unique code generated by the unique-code generating unit 216. Thus, the teller who has received the journal can cause the unique-code generating unit 216 to generate a unique code without the need to manually calculate the unique code based on the deposit information printed on the received journal, so that the teller can easily compare the unique code printed on the journal with the unique code generated by the unique-code generating unit 216.

Second Embodiment

Figure 9:
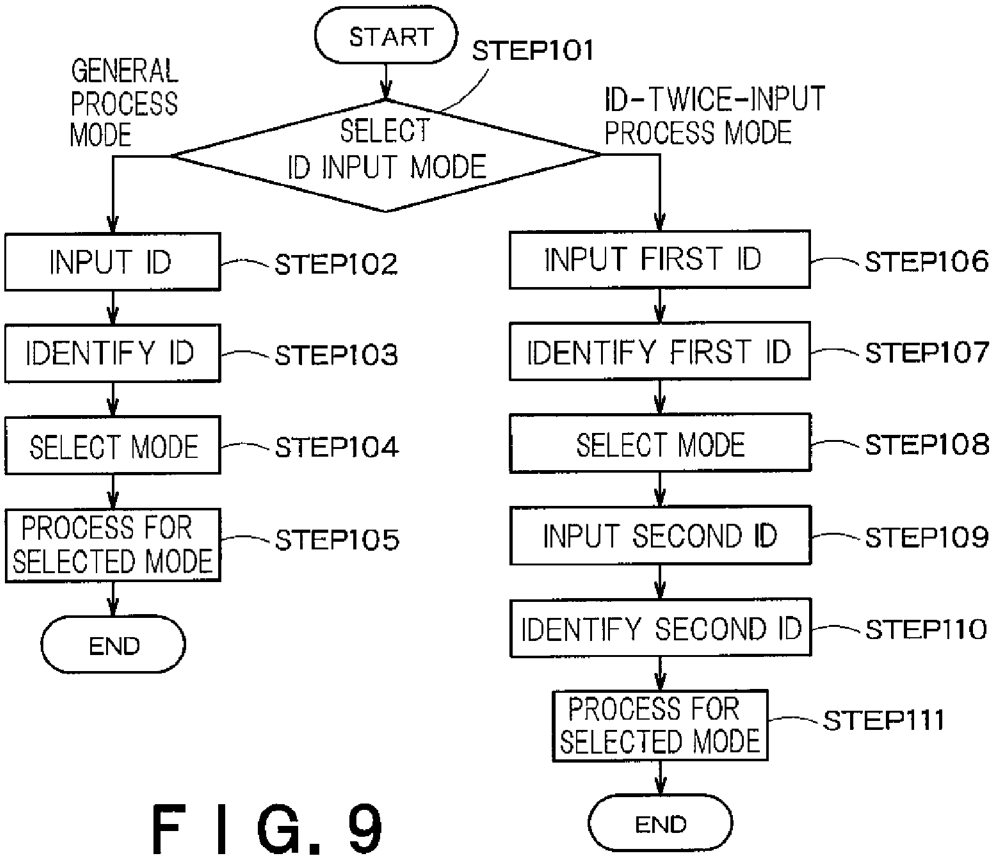
FIG. 9 is a flowchart showing an ID input method for a banknote deposit machine according to the second embodiment of the present invention.
Figure 10:
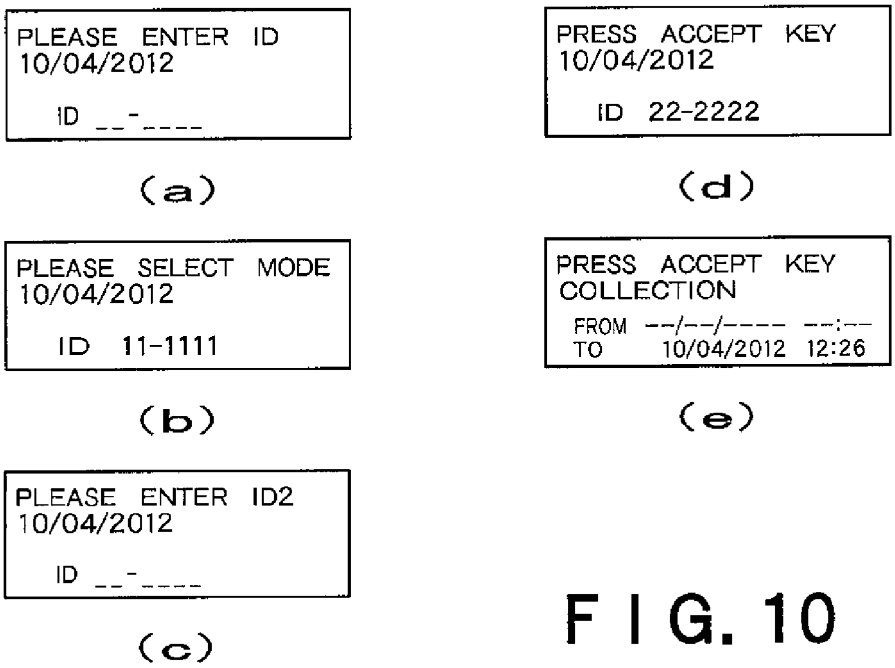
FIG. 10 is a view showing a display screen of a monitor of the display and input unit of the banknote deposit machine, when an ID-twice-input process mode is executed in accordance with the ID input method shown in FIG. 9.

The second embodiment of the present invention will be explained herebelow with reference to the drawings. FIG. 9 is a flowchart showing an ID input method for a banknote deposit machine according to the second embodiment. FIG. 10 is a view showing a display screen of a monitor of the display and input unit of the banknote deposit machine, when an ID-twice-input process mode is executed in accordance with the ID input method shown in FIG. 9. In the explanation of the second embodiment, the explanation for parts in common with the first embodiment is omitted. The same banknote deposit machine 1 as the first embodiment is used in the second embodiment.

When an operator executes various processes such as a deposit process or a collection process, a general (conventional) banknote deposit machine verifies authority of the operator based on inputted ID information of the operator. Compared to this, the banknote deposit machine 1 of the second embodiment can selectively execute any one mode from a general mode, in which ID information of one operator has to be inputted, and an ID-twice-input process mode, in which ID information of each of two operators has to be inputted.

The ID input method for the banknote deposit machine 1 of this embodiment is explained with reference to the flowchart shown in FIG. 9 and the view of the display screen of the monitor 5*a* of the display and input unit 5 shown in FIG. 10.

When the operator starts to operate the banknote deposit machine 1, the operator inputs which process mode is executed by means of the input key 5*b* of the display and input unit 5, among the general process mode and the ID-twice-input process mode (STEP 101). Herein, when the operator selects the general process mode, the operator inputs his or her ID information into the banknote deposit machine 1 (STEP 102). Herein, the operator may input a number corresponding to the ID information by means of the input key 5*b* of the display and input unit 5 or the numeric key 7. Alternatively, the operator may input the ID information by causing the card reading unit 8 to read an ID card, which the operator carries, so as to automatically input the ID information into the control unit 50.

The control unit 50 verifies authority of the operator based on the inputted ID information of the operator (STEP 103). Thereafter, within the verified authority of the operator, the operator can select a specific process mode such as a deposit process or a collection process (STEP 104). Thus, the banknote deposit machine 1 can execute a process for each mode (STEP 105).

Next, the ID-twice-input process mode is explained below. As described above, the ID-twice-input process mode is a mode wherein the ID information of each of two operators has to be inputted into the banknote deposit machine 1. Assume that, when the operator starts to operate the banknote deposit machine 1, the operator selects that the ID-twice-input process mode is executed. Then, the display screen as shown in FIG. 10 (*a*) is displayed on the monitor 5*a* of the display and input unit 5, so as to prompt the operator to input ID information of the first operator. Thereafter, the operator inputs a number corresponding to his or her own ID information by means of the input key 5*b* of the display and input unit 5 or the numeric key 7 (STEP 106). The control unit 50 verifies authority of the first operator based on the inputted ID information of the first operator (STEP 107). Thereafter, the first operator can select a specific process mode such as a deposit process or a collection process by means of the display screen as shown in FIG. 10 (*b*) (STEP 108).

When the first operator selects a process mode, the display screen as shown in FIG. 10 (*c*) is displayed on the monitor 5*a* of the display and input unit 5, so as to prompt the operator to input ID information of the second operator. Then, as shown in FIG. 10 (*d*), a second operator inputs a number corresponding to his or her own ID information by means of the input key 5*b* of the display and input unit 5 or the numeric key 7 (STEP 109). The control unit 50 verifies authority of the second operator based on the inputted ID information of the second operator (STEP 110). Thereafter, within the verified authorities of the first operator and the second operator, the banknote deposit machine 1 can execute a process for each mode. At this moment, for example, the display screen as shown in FIG. 10 (*e*) is displayed on the monitor 5*a* of the display and input unit 5. As described above, in the ID-twice-input process mode, unless the authorities of the two operators are verified based on their ID information, the banknote deposit machine 1 cannot execute a process for banknotes. That is to say, if the operator is alone, the banknote deposit machine 1 cannot execute a process for banknotes.

An operational example of the ID-twice-input process mode is explained below. When a collection process for collecting the storing cassette 70 from the banknote deposit machine 1 is executed, there is a possibility that the storing cassette 70 is stolen by a staffer of an armored car company. On the other hand, when a collection process is executed at the banknote deposit machine 1, if the office manager and a staffer of an armored car company cooperate to execute the collection process, it is prevented that the storing cassette 70 is stolen by the staffer. In this case, in the ID-twice-input process mode, ID information of the office manager and ID information of the staffer are respectively inputted into the banknote deposit machine 1, so that the respective authorities of the office manager and the staffer are verified. Accordingly, if the staff is alone, the storing cassette 70 cannot be collected.

In addition, as explained for the first embodiment, in the banknote deposit machine 1, an unfit note/an unfit coin that cannot be recognized by the recognition unit 40 and a valuable medium other than cash, such as a gift ticket, a check and so on, can be stored from the stacking unit 60 into the storing cassette 70 directly. In this case, if the operator directly puts the valuable medium or the like into the stacking unit 60, an inappropriate deposit process of the valuable medium or the like into the storing cassette 70 may be executed by a mistake of the operator. On the other hand, according to the present embodiment, when the valuable medium or the like is directly put into the storing cassette 70, the office manager and another staffer of the office cooperate to execute the process, so as to prevent an inappropriate deposit process of the valuable medium or the like into the storing cassette 70. In this case, in the ID-twice-input process mode, ID information of the office manager and ID information of the staffer of the office are respectively inputted into the banknote deposit machine 1, so that the respective authorities of the office manager and the staffer are verified. Accordingly, if the staff is alone, the valuable medium or the like cannot be directly put into the storing cassette 70.

As described above, in the banknote deposit machine 1 according to the second embodiment, the ID-twice-input process mode can be selectively executed. Thereby, it is prevented that the storing cassette 70 is stolen by a staffer of an armored company when a collection process for collecting the storing cassette 70 from the banknote deposit machine 1 is executed, and that the an inappropriate deposit process of the valuable medium or the like into the storing cassette 70 is executed by a mistake of the operator.

Third Embodiment

Figure 11:
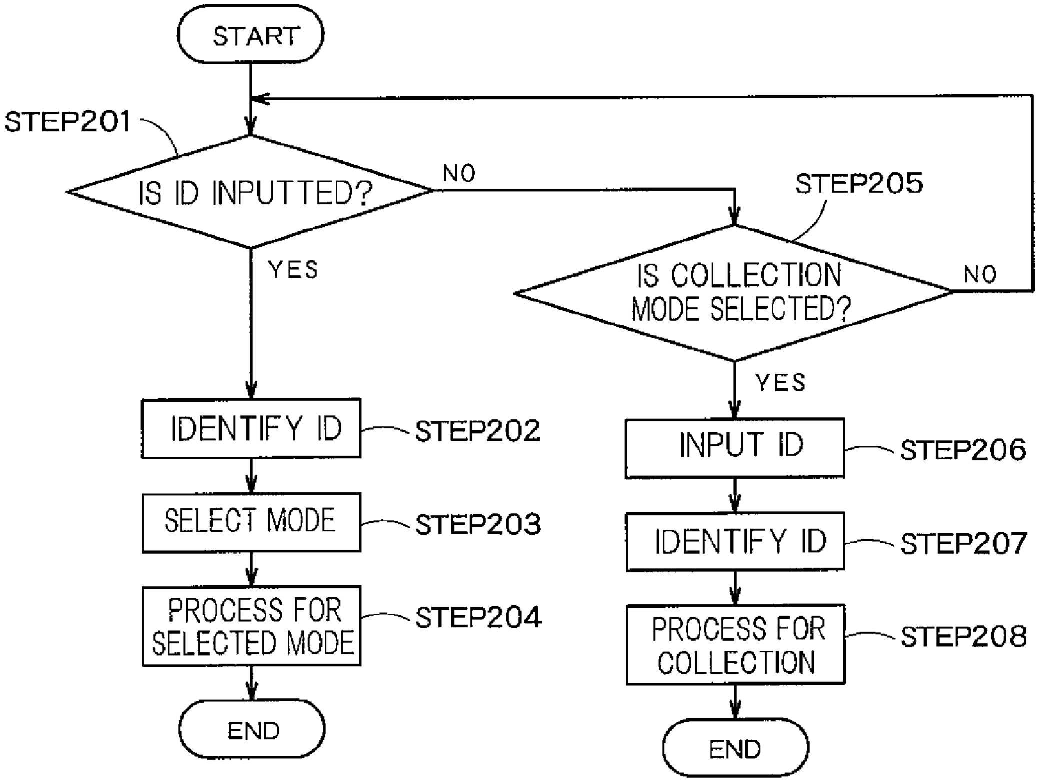
FIG. 11 is a flowchart showing an ID input method for a banknote deposit machine according to the third embodiment of the present invention.
Figure 12:
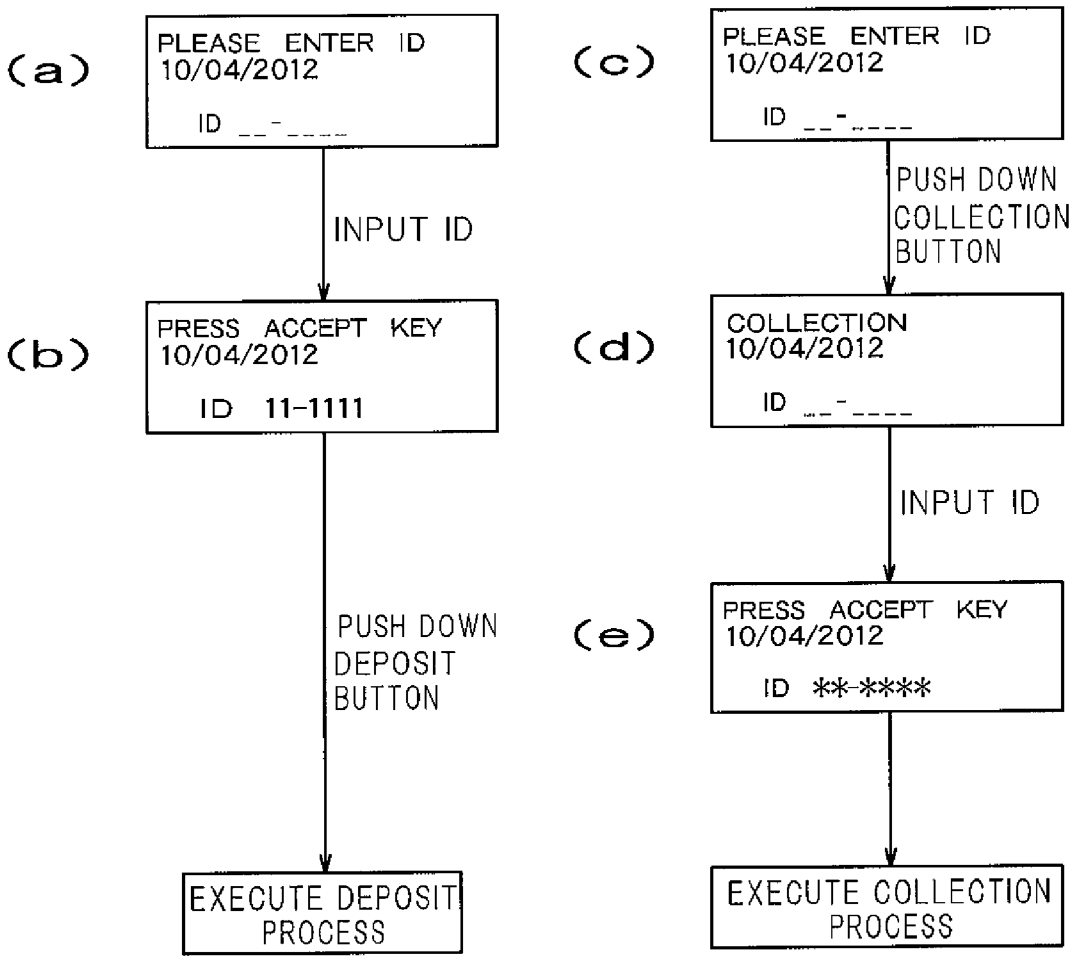
FIG. 12 is a view showing a display screen of a monitor of the display and input unit of the banknote deposit machine, when an ID-not-shown process mode is executed in accordance with the ID input method shown in FIG. 11.

The third embodiment of the present invention will be explained herebelow with reference to the drawings. FIG. 11 is a flowchart showing an ID input method for a banknote deposit machine according to the third embodiment. FIG. 12 is a view showing a display screen of a monitor of the display and input unit of the banknote deposit machine, when an ID-not-shown process mode is executed in accordance with the ID input method shown in FIG. 11. In the explanation of the third embodiment, the explanation for parts in common with the first embodiment or the second embodiment is omitted. The same banknote deposit machine 1 as the first embodiment is used in the third embodiment.

When a collection process for collecting the storing cassette 70 from the banknote deposit machine 1 is executed, a staffer of an armored company inputs his or her own ID information by means of the input key 5*b* of the display and input unit 5 or the like, in order that the banknote deposit machine 1 verifies the authority of the staffer. If the number corresponding to the ID information is displayed on the monitor 5*a* of the display and input unit 5 while the ID information is inputted, a staffer of the office may peek at the monitor, which may cause leakage of the ID information of the staffer of the armored car company. The third embodiment relates to a method for preventing such leakage of the ID information of the staffer of the armored car company when the staff collects the storing cassette 70 from the banknote deposit machine 1.

The ID input method for the banknote deposit machine 1 of this embodiment is explained with reference to the flowchart shown in FIG. 11 and the view of the display screen of the monitor 5*a* of the display and input unit 5 shown in FIG. 12.

When the operator executes a process at the banknote deposit machine 1, the display screen as shown in FIG. 12 (*a*) or FIG. 12 (*c*) is displayed on the monitor 5*a* of the display and input unit 5, so as to prompt the operator to input ID information of the operator. Then, when the operator inputs a number corresponding to his or her own ID information by means of the input key 5*b* of the display and input unit 5 or the numeric key 7 ("YES" in STEP 201), the control unit 50 verifies authority of the operator based on the inputted ID information of the operator (STEP 202). At this moment, the inputted number corresponding to the ID information is displayed on the monitor 5 of the display and input unit 5, as shown in FIG. 12 (*b*). Thereafter, within the verified authority of the operator, the operator can select a specific process mode such as a deposit process or a collection process (STEP 203). Thus, the banknote deposit machine 1 can execute a process for each mode (STEP 204). Specifically, for example, when the operator pushes down a deposit button, a deposit mode is selected so that a deposit process is executed.

On the other hand, when the display screen as shown in FIG. 12 (*a*) or FIG. 12 (*c*) is displayed on the monitor 5*a* of the display and input unit 5, the operator can push down a collection button to select a collection mode, instead of inputting the number corresponding to the ID information. When the operator pushes down the collection button ("YES" in STEP 205), the monitor 5 displays that the collection mode has been selected. Specifically, "COLLECTION" is indicated, as shown in FIG. 12 (*d*). Thereafter, when the operator inputs the number corresponding to his or her own ID information by means of the input key 5*b* of the display and input unit 5 or the numeric key 7 ("YES" in STEP 206), the control unit 50 verifies authority of the operator based on the inputted ID information of the operator (STEP 207). At this moment, the inputted number corresponding to the ID information is not displayed on the monitor 5 of the display and input unit 5, as shown in FIG. 12 (*e*). Thereafter, the collection process is executed at the banknote deposit machine 1 (STEP 208).

In the banknote deposit machine 1 of this embodiment, the usual-collection operation, in which the number corresponding to the ID information is always displayed on the monitor 5*a* of the display and input unit 5 when the ID information is inputted for the collection process, and the ID-not-shown operation as shown in FIGS. 11 and 12 may be switched depending on the setting. As a switching method, a SD card may be inserted into a SD-card reading unit (not shown) of the banknote deposit machine 1 so as to read the setting stored in the SD card. Alternatively, an upper-level interface may switch the operation of the banknote deposit machine 1.

As described above, according to the banknote deposit machine 1 of the third embodiment, when a staff of an armored car company executes a collection process to collect the storing cassette 70 from the banknote deposit machine 1, the number corresponding to the ID information is not displayed while the number is inputted, if the operator pushes down the collection button to select the collection mode while the display screen to prompt the operator to input the ID information of the operator is displayed on the monitor 5*a* of the display and input unit 5. On the other hand, when an operator executes a deposit process, the inputted number corresponding to the ID information is displayed when the number is inputted while the display screen to prompt the operator to input the ID information of the operator is displayed on the monitor 5*a* of the display and input unit 5, so that the operator can confirm whether the inputted number is correct or not. Thus, according to the banknote deposit machine 1 of the third embodiment, operability is good since the inputted ID information is displayed on the monitor 5*a* of the display and input unit 5 in the usual deposit mode, and also security is improved since the leakage of the ID information of the staff of the armored car company is prevented at the collection process of the storing cassette 70.

Fourth Embodiment

Figure 13:
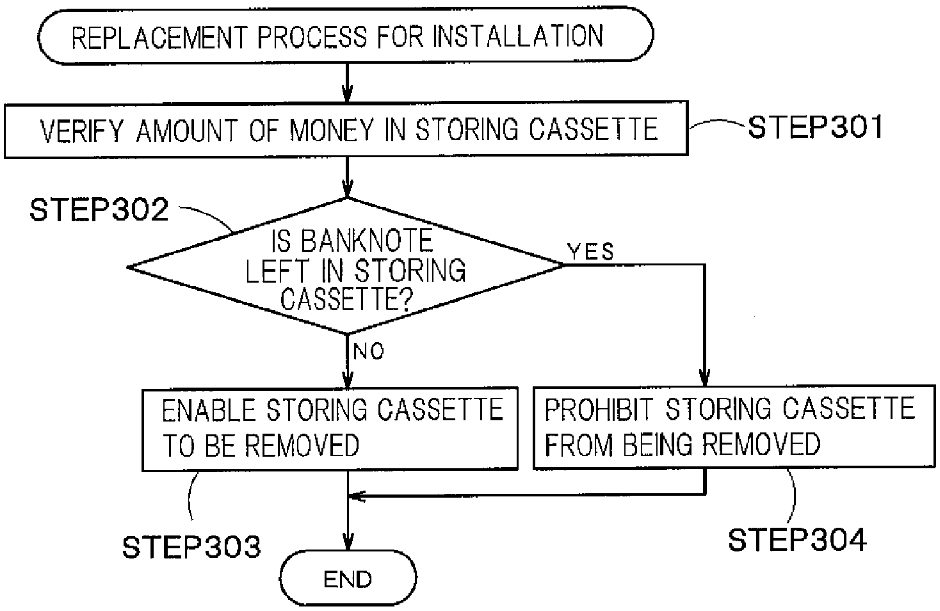
FIG. 13 is a flowchart of a replacement method of a storing cassette for a banknote deposit machine according to the fourth embodiment of the present invention.

The fourth embodiment of the present invention will be explained herebelow with reference to the drawings. FIG. 13 is a flowchart showing a replacement method of the storing cassette for a banknote deposit machine according to the fourth embodiment. In the explanation of the fourth embodiment, the explanation for parts in common with the first to third embodiments is omitted. The same banknote deposit machine 1 as the first embodiment is used in the fourth embodiment.

When the banknote deposit machine 1 as shown in FIG. 2 and so on is installed at the office, a staffer for the installation disposes the banknote deposit machine 1 at a predetermined position under a condition wherein the storing cassette 70 is removed, and fixes the banknote deposit machine 1 to the floor from the inside by means of an anchor bolt. Thereafter, it is necessary to set the storing cassette 70 into the banknote deposit machine 1. Thus, conventionally, ID information for the staffer for the installation has been registered on the banknote deposit machine 1, and the staffer for the installation inputs the ID information to execute the setting or replacement of the storing cassette 70. However, in this manner, a malicious staffer for the installation may not delete the ID information registered on the banknote deposit machine 1 even after the installation process of the banknote deposit machine 1 is finished. Then, at a later day, the staffer may use the ID information for the staffer to steal the storing cassette 70.

Compared to this, according to the banknote deposit machine 1 of the fourth embodiment, when no banknote is left in the storing cassette 70, a door 77 of the banknote deposit machine 1 can be opened to remove the storing cassette 70 without inputting any ID information. Such a replacement method of the storing cassette 70 for the banknote deposit machine 1 is explained with reference to FIG. 13.

As shown in FIG. 13, when the staffer for the installation executes a replacement process of the storing cassette 70, the staffer inputs a replacement instruction for the storing cassette 70 by means of the input key 5*b* of the display and input unit 5. Then, the control unit 50 verifies the amount of money in the storing cassette 70 (STEP 301). Thereafter, if no banknote is left in the storing cassette 70 ("NO" in STEP 302), an electromagnetic kay of the door 77 of the banknote deposit machine 1 is opened, which makes it possible to open the door 77. This enables the storing cassette to be removed (STEP 303). On the other hand, if one or more banknotes are left in the storing cassette 70 ("YES" in STEP 302), the electromagnetic kay of the door 77 of the banknote deposit machine 1 remains locked, which prohibits the storing cassette from being removed (STEP 304). When the banknote deposit machine 1 is installed, no banknote is left in the storing cassette 70. Thus, the storing cassette 70 can be replaced without the need to register the ID information for the staffer for the installation on the banknote deposit machine 1 and without the need for the staffer to input the ID information. After the banknote deposit machine 1 has been installed, when a deposit process or the like is executed at the banknote deposit machine 1, one or more banknotes are put in the storing cassette 70, which prohibits the staffer for the installation from removing the storing cassette 70 from the banknote deposit machine 1.

Herein, when the banknote deposit machine 1 is operated as shown in the flowchart of FIG. 13 is not limited to when the banknote deposit machine 1 is installed. For example, when the banknote deposit machine 1 is subjected to a maintenance process as well, if no banknote is left in the storing cassette 70, the electromagnetic kay of the door 77 of the banknote deposit machine 1 is opened, which makes it possible to open the door 77 so that the storing cassette can be removed, without the need to input the ID information of the operator. In addition, as a modified example of the fourth embodiment, it may be verified whether a transaction history is stored in the memory unit 54 or not. In this example, the storing cassette 70 can be set and removed without the need to input any ID information, only when no transaction history is stored (the situation wherein the banknote deposit machine 1 has been newly installed).

As described above, according to the banknote deposit machine 1 of the fourth embodiment, there is no need to register the ID information for the staffer for the installation on the banknote deposit machine. Thus, it is prevented that the staffer for the installation steal the storing cassette 70 after the banknote deposit machine 1 is installed. In addition, during the installation of the banknote deposit machine 1, man hours can be reduced.

Fifth Embodiment

The fifth embodiment of the present invention will be explained herebelow. In the explanation of the fifth embodiment, the explanation for parts in common with the first to fourth embodiments is omitted. The same banknote deposit machine 1 as the first embodiment is used in the fifth embodiment.

In the general banknote deposit machine, the language to be displayed and the currency to be recognized can be set, in order to cope with various languages and currencies that the operator may request. In detail, in the conventional banknote deposit machine, the ID information has been set for each operator, and the first operator inputs his or her own ID information into the banknote deposit machine and, if the first operator is a Japanese and if necessary, the first operator sets Japanese as the language to be displayed on the monitor and yen as the currency to be handled, through the display and input unit or the like. Thereafter, the first operator deposits yen banknotes into the banknote deposit machine with reference to the Japanese display on the monitor. Subsequently, if the second operator who wants to execute a deposit process at the banknote deposit machine is an American, the second operator also inputs his or her own ID information into the banknote deposit machine and, if necessary, the second operator sets English as the language to be displayed on the monitor and dollar as the currency to be handled, through the display and input unit or the like. Thereafter, the second operator deposits dollar banknotes into the banknote deposit machine with reference to the English display on the monitor. However, according to this type of conventional banknote deposit machine, when the operator attempts a deposit process or the like and finds that the language to be displayed and the currency to be handled have been changed from those corresponding to the operator, the operator has to change again the language and the currency, which is troublesome to the operator.

Compared to this, according to the fifth embodiment, the language and the currency as well as the ID information are set for each operator in the banknote deposit machine 1. Specifically, in the banknote deposit machine 1, the language and the currency are associated with the ID information for each operator. Accordingly, when the first operator inputs his or her own ID information into the banknote deposit machine 1 to execute a deposit process at the banknote deposit machine 1, if the first operator is a Japanese, the language to be displayed on the monitor 5*a* is automatically set to Japanese, and the currency to be handled is automatically set to yen. Thereby, the first operator can deposit yen banknotes into the banknote deposit machine 1. Subsequently, when the second operator inputs his or her own ID information into the banknote deposit machine 1 to execute a deposit process at the banknote deposit machine 1, even if the second operator is an America, the language to be displayed on the monitor 5*a* is automatically set to English, and the currency to be handled is automatically set to dollar. Thereby, the second operator can deposit dollar banknotes into the banknote deposit machine 1.

As described above, in the fifth embodiment, the ID information, the language and the currency are set for each operator in the banknote deposit machine 1. Herein, the setting for them may be done by a manager of the banknote deposit machine 1. Alternatively, the memory unit 54 may store the setting for them at the previous deposit process by the same operator, and the setting stored in the memory unit 54 may be used again automatically.

As described above, according to the banknote deposit machine 1 of the fifth embodiment, the language to be displayed on the monitor 5*a* and the currency to be handled are automatically set after the operator inputs the ID information. Thus, even when the banknote deposit machine 1 is installed at a location wherein a plurality of languages and currencies are mixed, such as an office at an international airport or a downtown, operability for the operator can be improved, which can prevent an inappropriate process or operation caused by a mistake of the operator.

Sixth Embodiment

Figure 14:
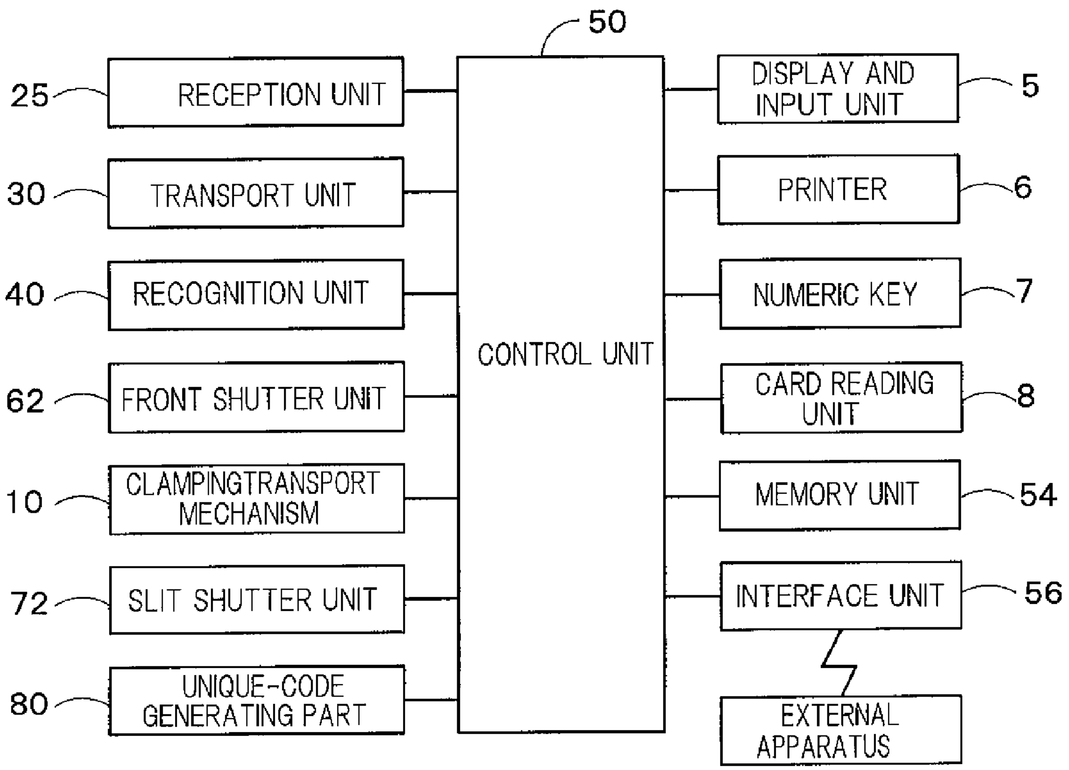
FIG. 14 is a functional block view of a banknote deposit machine according to the sixth embodiment of the present invention.
Figure 15:
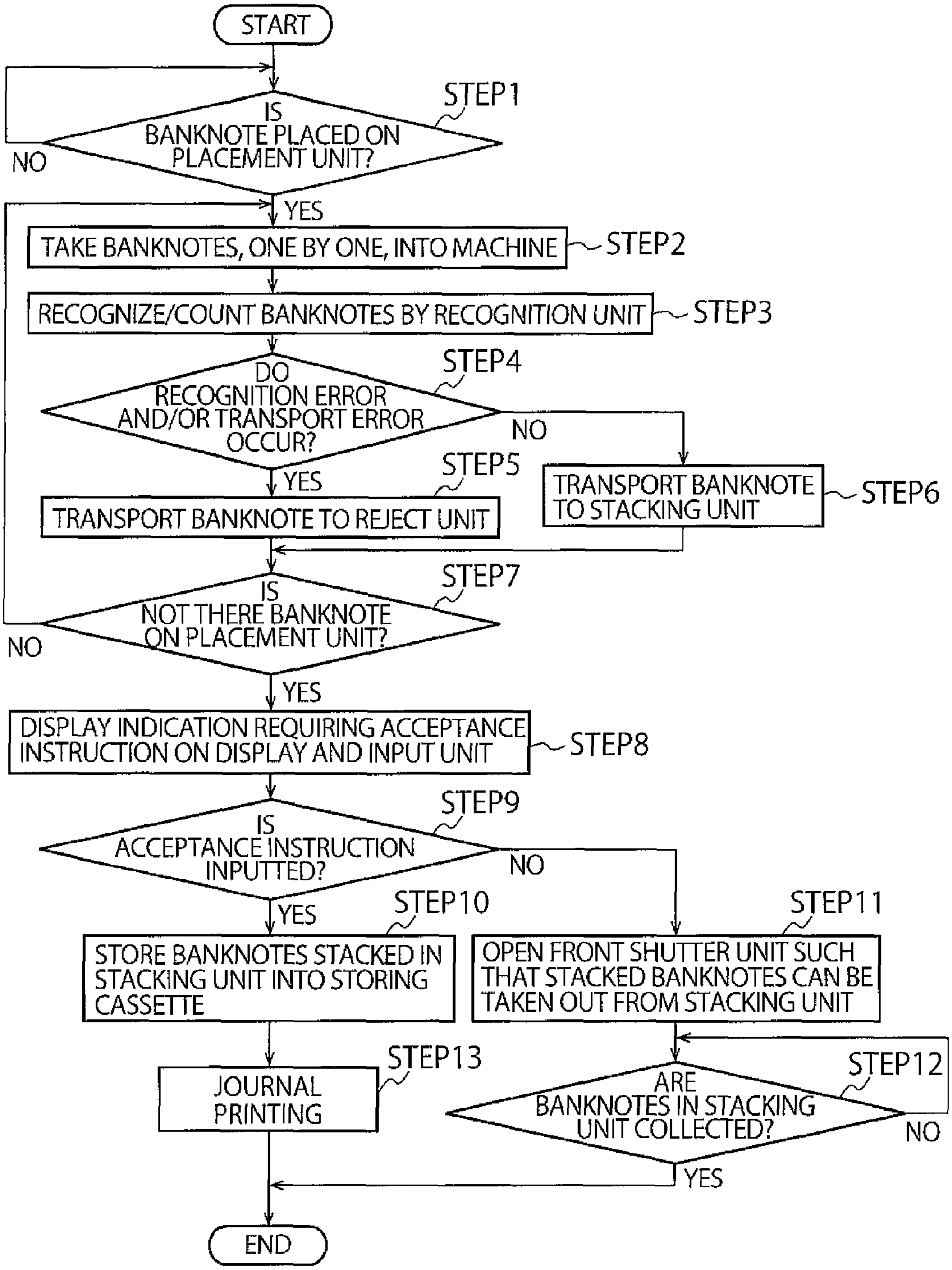
FIG. 15 is a flowchart showing a banknote deposit process in the banknote deposit machine according to the sixth embodiment of the present invention.
Figure 16:
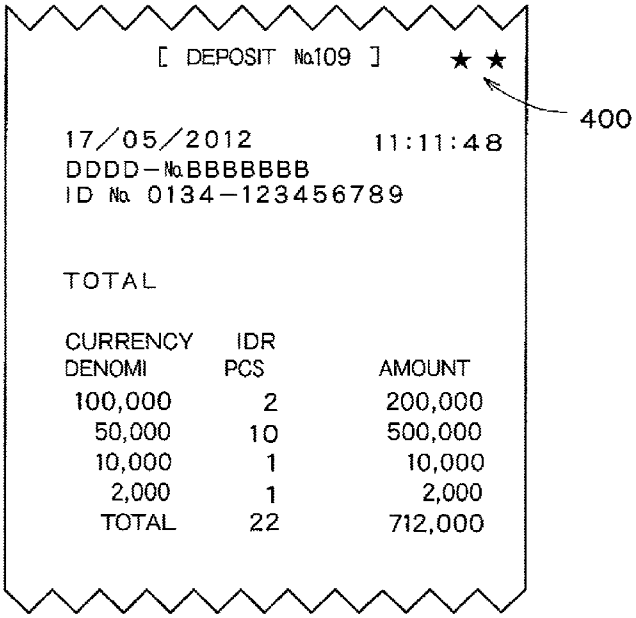
FIG. 16 is a view showing contents of a journal printed by a printer of the banknote deposit machine according to the sixth embodiment of the present invention.
Figure 17:
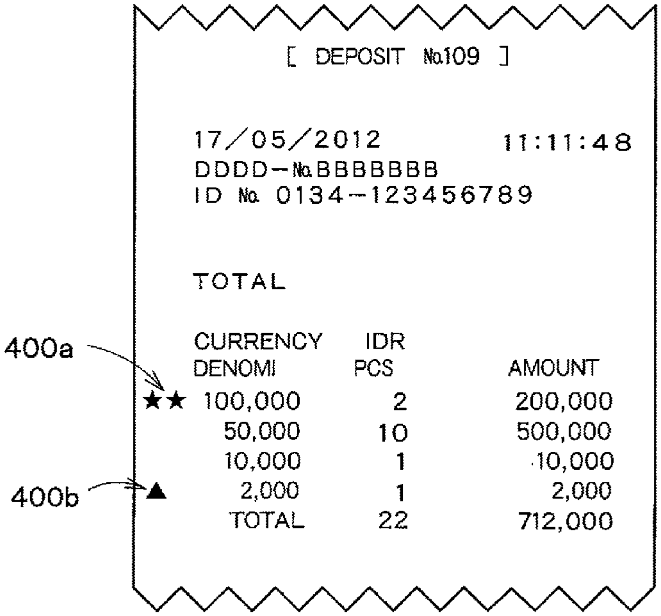
FIG. 17 is a view showing contents of another journal printed by the printer of the banknote deposit machine according to the sixth embodiment of the present invention.

The sixth embodiment of the present invention will be explained herebelow with reference to the drawings. FIG. 14 is a functional block view of a banknote deposit machine according to the sixth embodiment. FIG. 15 is a flowchart showing a banknote deposit process in the banknote deposit machine according to the sixth embodiment. FIG. 16 is a view showing contents of a journal printed by a printer of the banknote deposit machine according to the sixth embodiment. FIG. 17 is a view showing contents of another journal printed by the printer of the banknote deposit machine according to the sixth embodiment. In the explanation of the sixth embodiment, the explanation for parts in common with the first to fifth embodiments is omitted. The same banknote deposit machine 1 as the first embodiment and the same money handling system including the banknote deposit machine 1 as the first embodiment are used in the sixth embodiment. However, in the sixth embodiment, the unique-code generating unit 80 and the reception processing apparatus 210 are not used. Thus, the unique-code generating unit 80 and the reception processing apparatus 210 may not be provided. In FIG. 14, the unique-code generating unit 80 is not indicated.

An operation of the banknote deposit machine 1 in the sixth embodiment is explained with reference to the flowchart shown in FIG. 15.

When the operator places a plurality of banknotes P on the placement unit 20 ("YES" in STEP 1), the plurality of banknotes P placed on the placement unit 20 are taken, one by one, into the machine by the reception unit 25 (STEP 2). At this time, the undermost banknote P among the plurality of banknotes P placed on the placement unit 20 is kicked out by the kicker roller 26, and the kicked-out banknote P is fed out by the feed roller 27*a*. The banknotes P fed by the feed roller 27*a* are separated, one by one, by the action of the gate roller 27*b*.

Following thereto, the banknotes P having been taken in by the reception unit 25 are transported by the transport unit 30. At this time, the banknotes P transported by the transport unit 30 are recognized/counted by the recognition unit 40 disposed on the transport unit 30 (STEP 3). The control unit 50 judges whether the banknote(s) P recognized and counted by the recognition unit 40 is a normal banknote or a reject banknote based on the recognition/count result of the banknote(s) P by the recognition unit 40.

During the transport of the banknotes P by the transport unit 30, when the recognition error and/or the transport error occur ("YES" in STEP 4), the banknote(s) P is transported to the reject unit 65 (STEP 5). On the other hand, when the recognition error and/or the transport error do not occur ("NO" in STEP 4), the banknotes P being transported are transported to the stacking unit 60 (STEP 6).

When the banknotes P are transported to the stacking unit 60, the banknotes P are received between the vanes 35*a* of the stacking wheel 35 so as to be aligned and stacked in the stacking unit 60. Then, the banknotes P having been transported by the stacking wheel 35 are stacked in the stacking unit 60 such that the banknotes P are inclined toward the front surface side in a standing condition. The display and input unit 5 displays a number of the banknotes P stacked in the stacking unit 60 for each denomination and a total amount of the banknotes P stacked in the stacking unit 60. In addition, the recognition result (the number of the banknotes P stacked in the stacking unit 60 for each denomination, the total amount of the banknotes P, and so on) together with the ID of the operator is stored in the memory unit 54.

In the above manner, when all the plurality of banknotes P placed on the placement unit 20 have been transported to the stacking unit 60 so that no banknote P remains on the placement unit 20 ("YES" in STEP 7), an indication for requiring an acceptance instruction for the number of the banknotes P stacked in the stacking unit 60 for each denomination and the total amount of the banknotes P stacked in the stacking unit 60 is displayed on the display and input unit 5 (STEP 8).

Then, as shown in "YES" in STEP 9, when the acceptance instruction is inputted by the operator through the display and input unit 5 (specifically, when the operator presses down the return key of the display and input unit 5), the plurality of banknotes P stacked in the stacking unit 60 are stored into the storing cassette 70 through the slit opening 71 by the clamping transport mechanism 10 (STEP 10) (see arrow $A_1$ of FIG. 3). At this time, the slit shutter unit 72 is moved on the front surface side so that the slit-like slit opening 71 is opened. On the other hand, except when a banknote(s) P is stored in the storing cassette 70, the slit shutter unit 72 is moved on the rear surface side so that the slit opening 71 is closed. In addition, when the banknote(s) stacked in the stacking unit 60 is stored in the storing cassette 70, deposit information (the deposit date, the number of the deposited banknotes P for each denomination, the total amount of the deposited banknotes P, the deposit ID information, or the like) is printed on a journal (receipt) by the printer 6 (STEP 13). The journal is outputted from the banknote deposit machine 1.

When there is a banknote(s) P in the reject unit 65, the operator places the banknote P again on the placement unit 20. Thus, the steps as described above are repeated so that all the banknotes P are transported to the stacking unit 60. However, a banknote P, which is transported to the reject unit 65 no matter how many times the operator tries, is judged as an unreceivable banknote P, and such a banknote P is excluded from the banknotes to be stored. The operator will give up depositing such a reject banknote, or bring it to the teller window to execute a deposit process for it. In addition, when the operator does not accept the number of the banknotes P stacked in the stacking unit 60 for each denomination and/or the total amount thereof ("NO" in STEP 9), by inputting a return instruction through the display and input unit 5, the front shutter unit 62 is opened, whereby the stacked banknotes P can be taken out (STEP 11) (see arrow $A_2$ of FIG. 3). When the banknotes P stacked in the stacking unit 60 have been collected by the operator ("YES" in STEP 12), the process is finished.

Next, the deposit information printed on the journal by the printer 6 when the deposit process of the banknotes P was executed as shown in FIG. 15, is explained in detail with reference to FIG. 16. FIG. 16 is a view showing contents of the journal printed by the printer 6 of the banknote deposit machine 1. In the contents of the journal shown in FIG. 16, "[DEPOSIT No. 109]" indicates the transaction number, "17/05/2012" indicates the deposit date, and "11:11:48" indicates the deposit time. In addition, "DDDD-No. BBBBBBB" indicates the apparatus ID of the banknote deposit machine 1 (specifically, information indicating the office location and the apparatus number), and "ID No. 0134-123456789" indicates the ID information of the operator. Furthermore, in the "CURRENCY" area, "DENOMI" indicates the denominations of the banknotes P, "PCS" indicates the numbers of the deposited banknotes P, and "AMOUNT" indicates the total amount of the deposited banknotes P for each denomination or for all denominations.

In the sixth embodiment, the printer 6 is configured to print, on the journal, information regarding a banknote(s) judged as a reject banknote(s) by the control unit 50 of the banknote deposit machine 1. In detail, the printer 6 is configured to print on the journal the information regarding the reject banknote(s) in such a manner that the information is not able to be recognized by the operator who has executed the money deposit process by the banknote deposit machine 1 (indicated by a reference sign A in FIG. 1) but in such a manner that the information is able to be recognized by the receiver who receives the journal (indicated by a reference sign B in FIG. 1). Specifically, for example, the printer 6 prints two star marks on the journal, as shown with a reference sign 400 in FIG. 16. Herein, the two star marks printed on the journal mean that there are two reject banknotes. In addition, the shape of each mark (for example, a star shape) indicates a reject factor.

In detail, the reject factor of a reject banknote (counterfeited banknote, damaged banknote, abnormally transported banknote, or the like) closely relates to which sensor has detected abnormality. Thus, if the respective types of sensors to detect abnormality are associated with the respective shapes of marks, the teller who receives the journal can recognize the reject factor of each reject banknote based on the shape of each mark printed on the journal. That is to say, the recognition unit 40 consists of plural types of sensors, i.e., a line sensor, a fluorescence sensor, a magnetic sensor, and the like. Then, assume that the line sensor is associated with a star shape, the fluorescence sensor is associated with a triangle shape, and the magnetic sensor is associated with a circle shape. In this case, if the line sensor in the recognition unit 40 detects abnormality, a star mark is printed on the journal. Thereby, the teller who receives the journal can recognize that the line sensor in the recognition unit 40 has detected abnormality based on the shape of the mark printed on the journal.

As described above, according to the sixth embodiment, the printer 6 is configured to print on the journal the information regarding the reject factor of each reject banknote and the information regarding the number of the reject banknote(s), as the information regarding the banknote(s) judged as the reject banknote(s). In addition, for example, the two star marks are printed on the journal, as shown together with a reference sign 400 in FIG. 16, as the information regarding the banknote(s) judged as the reject banknote(s). The meanings of such marks (the reject factor of each reject banknote and the number of the rejected banknote(s)) are not able to be recognized by the operator who has executed the money deposit process by the banknote deposit machine 1, but are able to be recognized by the receiver who receives the journal. If the reject factor of a reject banknote relates to a counterfeiting, the teller can judge whether the reject banknote received from the operator is counterfeited, by irradiating the banknote with the lamp for judging authenticity provided on the side of the teller at the teller window 200.

The information regarding the banknote(s) judged as the reject banknote(s) may be printed on the journal for each denomination of the reject banknote(s), correspondingly to the count results of the banknote(s) for each denomination. FIG. 17 shows contents of another journal on which the information regarding the banknote(s) judged as the reject banknote(s) are printed for each denomination of the reject banknote(s), correspondingly to the count results of the banknote(s) for each denomination.

On the journal shown in FIG. 17, two star marks are indicated on the left side of “100,000” of “DENOMI” (see a reference sign 400*a* in FIG. 17), and one triangle mark is indicated on the left side of “2,000” of “DENOMI” (see a reference sign 400*b* in FIG. 17). These mean that the line sensor in the recognition unit 40 has detected abnormality in two banknotes whose denomination is “100,000” and that the fluorescence sensor in the recognition unit 40 has detected abnormality in one banknote whose denomination is “2,000”, regarding the banknotes judged as the reject banknotes by the control unit 50 of the banknote deposit machine 1. Thus, the teller can accurately and efficiently verify the banknotes received from the operator, by focusing on the denominations of “100,000” and “2,000”.

As described above, according to the banknote deposit machine 1 and the money handling method of the seventh embodiment, the control unit 50 functioning as a judging unit is configured to judge whether the banknote recognized by the recognition unit 40 is a normal banknote or a reject banknote, based on the recognition result by the recognition unit 40; and the printer 6 is configured to print on the journal the information regarding the banknote(s) judged as the reject banknote(s) by the control unit 50. Since the information regarding the banknote(s) judged as the reject banknote(s) is printed on the journal, even if a counterfeited banknote is put into the banknote deposit machine 1, a receiver of the journal (the teller at the teller window of the finance institution) can find that the reject banknote is probably the counterfeited banknote.

In addition, if the printer 6 is configured to print on the journal the information regarding the reject banknote(s) in such a manner that the information is not able to be recognized by the operator who has executed the money deposit process at the banknote deposit machine 1, only the receiver of the journal (the teller at the teller window of the finance institution) can find that the reject banknote is a counterfeited banknote, while the operator cannot find it. This can prevent various troubles that may be caused by the operator who has found that the reject banknote is a counterfeited banknote.

The banknote deposit machine 1 and the money handling method by means of the banknote deposit machine 1 according to the seventh embodiment are not limited to the above manner, but may be variously modified.

For example, the information regarding the banknotes judged as the reject banknotes by the control unit 50 may not be printed on the journal as the marks as shown in FIGS. 16 and 17. For example, the printer 6 may print on the journal a barcode as the information regarding the reject banknote(s). Alternatively, if there is a banknote judged as a reject banknote by the control unit 50 among the banknote(s) deposited into the banknote deposit machine 1 by the operator, the printer 6 may change a font and/or a color of characters indicating the count result of the deposited banknote(s) to be printed on the journal, depending on the reject factor of each reject banknote and the number of the reject banknote(s).

In addition, when the operator deposits banknotes into the banknote deposit machine 1, the printer 6 may be configured to print on the journal, information as to how many other banknotes can be stored in the storing cassette 70, or information as to how many percentages is the ratio of the vacant volume of the storing cassette 70 to the entire volume thereof, in addition to the count result of the deposited banknotes, in such a that those information are not able to be recognized by the operator who has executed the money deposit process at the banknote deposit machine 1. In addition, when the storing cassette 70 of the banknote deposit machine 1 has reached a full status or a near-full status, or when a roll paper of the printer 6 has run out, the printer 6 may be configured to print on the journal these information, in addition to the count result of the deposited banknotes, in such a that those information are not able to be recognized by the operator who has executed the money deposit process at the banknote deposit machine 1. Thereby, even when the banknote deposit machine 1 is not connected to any management system and is used offline, the teller can be informed about the status of the banknote deposit machine 1, so that the teller can take measures for the status, if necessary.

Seventh Embodiment

Figure 18:
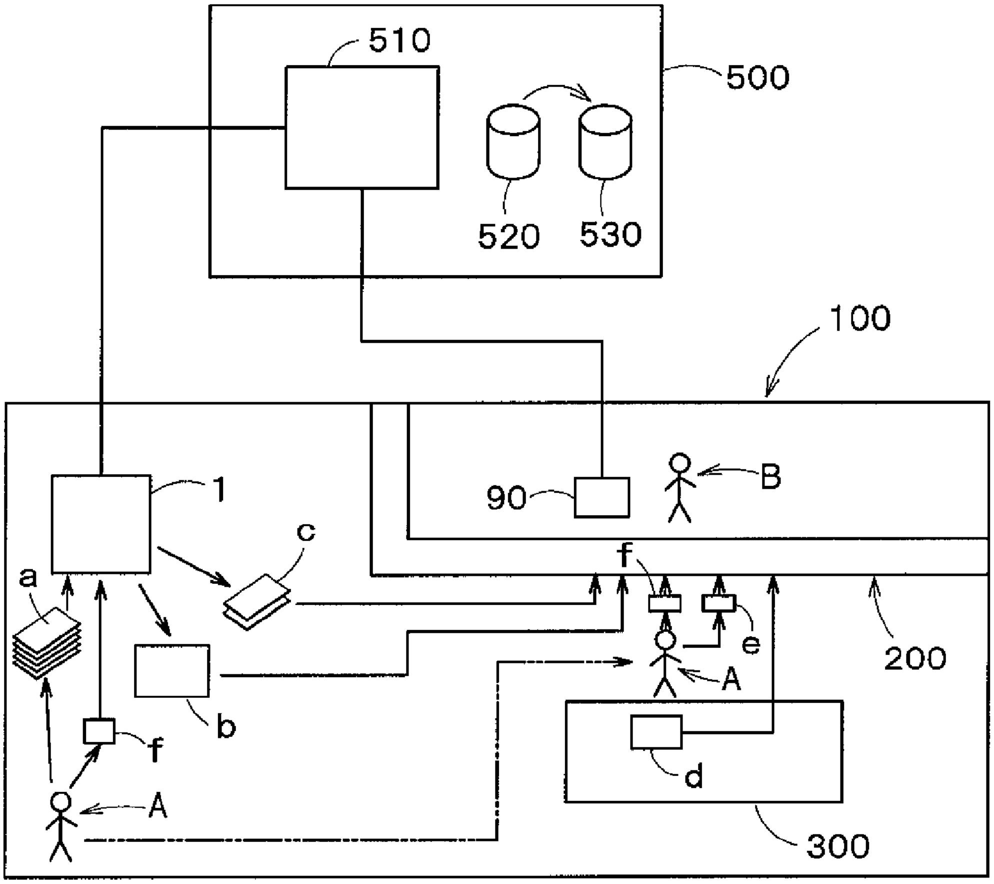
FIG. 18 is a schematic view showing a structure of a money handling system according to the seventh embodiment of the present invention.

The seventh embodiment of the present invention will be explained herebelow with reference to the drawings. FIG. 18 is a schematic view showing a structure of a money handling system according to the seventh embodiment. The money handling system shown in FIG. 18 is similar to the money handling system shown in FIG. 1. However, a data center 500 of the finance institution such as a bank is provided in the money handling system shown in FIG. 18, separately from the office 100 of the finance institution, differently from the money handling system shown in FIG. 1. A host server 510 located in the data center 500 and the banknote deposit machine 1 located in the office 100 are communicatively connected. In addition, in the money handling system shown in FIG. 18, a computer 90 is provided for each teller on the side of the teller at the teller window 200. The computer 90 is also communicatively connected with the host server 510 in the data center 500.

In the money handling system shown in FIG. 18, an operator who wants to deposit money (indicated by a reference sign A in FIG. 18) causes the card reading unit 8 of the banknote deposit machine 1 to read an ID card (indicated by a reference sign f in FIG. 18) exclusively for deposit processes. Thus, the banknote deposit machine 1 can obtain the ID information of the operator. The obtained ID information is transmitted from the banknote deposit machine 1 to the host server 510. In the host server 510, the ID information that has been stored in the ID card exclusively for deposit processes and the number of a bank account of the operator 530 have been associated with each other in advance.

Next, the operator executes a deposit process of banknotes (indicated by a reference sign a in FIG. 1) at the banknote deposit machine 1. After the banknote deposit process has been executed at the banknote deposit machine 1, deposit information that is information regarding the deposited banknotes is printed on a journal (receipt) at the banknote deposit machine 1, and subsequently the journal is outputted from the banknote deposit machine 1. (The journal outputted from the banknote deposit machine 1 is indicated by a reference sign b in FIG. 18.) In addition, when a deposit process of banknotes is executed at the banknote deposit machine 1, the deposit information is transmitted from the banknote deposit machine 1 to the host server 510.

Whenever a banknote(s) is deposited into the banknote deposit machine 1 located at each office 100 of the finance institution and the deposit information is transmitted from the banknote deposit machine 1, cash payment (deposit) is made from a bank account owned by a bank itself 520 to the bank account of the operator 530 in real time in the data center 500. Such payment (deposit) is made by a staffer in the data center 500, for example. (Alternatively, such payment (deposit) may be made automatically.) In addition, the ID information of the operator and the deposit information are transmitted from the host server 510 to the computer 90 located at the teller window 200 on the side of the teller.

Then, the operator moves to the teller window 200 installed at the lobby of the office 100 of the finance institution, and delivers by hand the ID card exclusively for deposit processes, a bank deposit book (indicated by a reference sign e in FIG. 18) and the like, to a teller indicated by a reference sign B in FIG. 18. At the same time, the operator may deliver by hand a journal outputted from the banknote deposit machine 1, reject banknote(s) paid back from the banknote deposit machine 1, and the like, to the teller. Furthermore, the operator may write in a transmittal form (indicated by a reference sign d in FIG. 18) at the table 300, and may deliver the transmittal form to the teller by hand. The teller can verify the deposit information corresponding to the ID information of the operator by operating (manipulating) the computer 90. Thereby, the teller prints the current deposit information on the bank deposit book received from the operator, based on the transmitted information from the host server 510 to the computer 90. Thereafter, the teller delivers back the ID card exclusively for deposit processes and the bank deposit book to the operator by hand, thereby a series of operations at the money handling system shown in FIG. 18 is finished.

According to the money handling system shown in FIG. 18, cash payment (deposit) is made to the bank account of the operator 530 based on the deposit information transmitted from the banknote deposit machine 1 to the host server 510, without the need to directly communicatively connect the banknote deposit machine 1 with an online system of the bank including the bank account owned by the bank itself 520 and the bank account of the operator 530. Thus, without the need to greatly change the bank system and without the need to develop a connection to the online system of the bank, cash is rapidly and surely paid by bank remittance to the bank account of the operator 530, by using the communicative connection between the banknote deposit machine 1 and the host server 510.

The money handling system of the seventh embodiment is not limited to the above manner, but may be variously modified.

For example, if the number of the bank deposit book that the operator owns and the number of the bank account of the operator 530 are associated with each other in advance in the host server 510, the ID card exclusively for deposit processes is not necessary. That is to say, even when the operator does not carry the ID card exclusively for deposit processes, if the operator inputs the number of the bank deposit book by means of the input key **5*b* of the display and input unit 5 or the numeric key 7 when the operator executes a deposit process at the banknote deposit machine 1, the host server 510 can identify the operator. Thereafter, when the deposit information of banknotes is transmitted from the banknote deposit machine 1 to the host server 510, cash is paid by bank remittance from the bank account owned by the bank itself 520 to the bank account of the operator 530 in the data center 500**.

1 Banknote deposit machine
**1*a*** Housing
5 Display and input unit
**5*a*** Monitor
**5*b*** Input key
6 Printer
7 Numeric key
8 Card reading unit
10 Clamping transport mechanism
20 Placement unit
25 Reception unit
26 Kicker roller
**27*a*** Feed roller
**27*b*** Gate roller
30 Transport unit
31 Transport belt
32 Transport roller
35 Stacking wheel
**35*a*** Vane
40 Recognition unit
50 Control unit
54 Memory unit
56 Interface unit
60 Stacking unit
**60*a*** Banknote presence detecting sensor
62 Front shutter unit
64 Support unit
65 Reject unit
70 Storing cassette
71 Slit opening
72 Slit shutter unit

75 Storing housing
76 Handle
77 Door
80 Unique-code generating unit
90 Computer
100 Office of finance institution
200 Teller window
210 Reception processing apparatus
212 Control unit
214 Reading unit
216 Unique-code generating unit
218 Display unit
300 Table
400, 400*a*, 400*b* Mark indicating information regarding banknote judged as reject banknote
500 Data center
510 Host server
520 Bank account owned by bank itself
530 Bank account of operator

The invention claimed is:

1. A money handling system comprising:

the a money handling machine for handling at least a money deposit process, and a reception processing apparatus configured to receive a journal printed by the money handling machine, wherein the money handling machine comprises:

a printing unit configured to print deposit information on the journal, the deposit information being information regarding money deposited into the money handling machine; and a unique-code generating unit configured to generate a unique code that is used for the received journal in judging whether the journal is authentic or counterfeit based on at least a part or all of the deposit information printed on journal by the printing unit;

wherein the printing unit is configured to print on the journal the unique code generated by the unique-code generating unit as well, and wherein the reception processing apparatus comprises:

a reading unit which is able to read the deposit information printed on the journal received; and an additional unique-code generating unit configured to generate a unique code in accordance with the same method as that of the unique-code generating unit in the money handling machine based on the deposit information read by reading unit for comparing the unique code printed on the journal with the unique code generated by the additional unique-code unit.

2. The money handling machine according to claim 1, wherein the unique-code generating unit is configured to generate the unique code, based on information not printed on the journal, in addition to the part or all of the deposit information printed on the journal by the printing unit.

3. The money handling machine according to claim 1, wherein the deposit information printed on the journal by the printing unit includes at least a date of the money deposit process or a time thereof.

4. The money handling machine according to claim 1, wherein the unique code generated by the unique-code generating unit is a number, an alphabet, a barcode, or a combination of a part or all of the number, the alphabet and the barcode.

* * * * *